(12) United States Patent
Chu et al.

(10) Patent No.: US 11,151,479 B2
(45) Date of Patent: *Oct. 19, 2021

(54) AUTOMATED COMPUTER-BASED MODEL DEVELOPMENT, DEPLOYMENT, AND MANAGEMENT

(71) Applicant: SAS Institute Inc., Cary, NC (US)

(72) Inventors: Chengwen Robert Chu, Cary, NC (US); Wenjie Bao, Cary, NC (US); Glen Joseph Clingroth, Raleigh, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/949,303

(22) Filed: Oct. 23, 2020

(65) Prior Publication Data
US 2021/0042659 A1 Feb. 11, 2021

Related U.S. Application Data

(63) Continuation of application No. 15/691,236, filed on Aug. 30, 2017.
(Continued)

(51) Int. Cl.
*G06N 20/00* (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS 6,920,458 B1 7/2005 Chu et al.
7,039,622 B2 5/2006 Chu
(Continued)

OTHER PUBLICATIONS

Bergstra, J. et al., "Algorithms for Hyper-Parameter Optimization," Advances in Neural Information Processing Systems, vol. 24 (2011) pp. 2546-2554. (Year: 2011).*
(Continued)

*Primary Examiner* — Brian M Smith
(74) *Attorney, Agent, or Firm* — Kilpatrick Townsend & Stockton LLP

(57) ABSTRACT

Computer-based models can be developed, deployed, and managed in an automated manner. For example, a model building tool can be selected based on the model building tool being compatible with one or more parameters. A first machine-learning model can be generated using the model building tool and trained using a training dataset. The first machine-learning model can then be used to perform a task. Thereafter, a new model-building tool can be selected based on the new model-building tool being compatible with the one or more parameters. A second machine-learning model can be generated using the new model-building tool and trained using the training dataset. The accuracy of the first machine-learning model can be compared to the accuracy of the second machine-learning model. Based on the second machine-learning model being more accurate, the second machine-learning model can be used to perform the particular task rather than the first machine-learning model.

30 Claims, 19 Drawing Sheets

Related U.S. Application Data

(60) Provisional application No. 62/382,163, filed on Aug. 31, 2016, provisional application No. 62/397,997, filed on Sep. 22, 2016.

(56) References Cited

U.S. PATENT DOCUMENTS

| | | | |
|---|---|---|---|
| 7,689,572 | B2 | 10/2010 | Chu et al. |
| 7,809,729 | B2 | 10/2010 | Chu et al. |
| 7,818,286 | B2 | 10/2010 | Chu et al. |
| 8,214,308 | B2 | 7/2012 | Chu |
| 8,473,431 | B1 | 6/2013 | Mann et al. |
| 8,595,154 | B2 | 11/2013 | Breckenridge et al. |
| 9,269,095 | B1 | 2/2016 | Chan et al. |
| 10,387,799 | B2 | 8/2019 | Mahler |
| 2002/0099581 | A1 | 7/2002 | Chu et al. |
| 2003/0065663 | A1 | 4/2003 | Chu |
| 2009/0106178 | A1 | 4/2009 | Chu |
| 2013/0031034 | A1 | 1/2013 | Gubin et al. |
| 2014/0282359 | A1 | 9/2014 | Feblowitz et al. |
| 2015/0379072 | A1 | 12/2015 | Dirac et al. |
| 2016/0063993 | A1 | 3/2016 | Dolan et al. |
| 2016/0170742 | A1* | 6/2016 | Pallath .................. G06F 8/33 717/120 |
| 2016/0300156 | A1 | 10/2016 | Bowers et al. |
| 2016/0314408 | A1 | 10/2016 | Gulwani et al. |
| 2018/0039894 | A1 | 2/2018 | Farrell et al. |
| 2018/0060759 | A1 | 3/2018 | Chu et al. |

OTHER PUBLICATIONS

Lane, N. et al., "DeepX: a software accelerator for low-power deep learning inference on mobile devices," 2016 15th ACM/IEEE Intl. Conf. on Information Processing in Sensor Networks (IPSN) (Apr. 28, 2016) 12 pp. (Year: 2016).*

Goodman, B. et al., "EU regulations on algorithmic decision making and a 'right to explanation'," downloaded from <arxiv.org/abs/1606.08813> (Aug. 31, 2016) 9 pp. (Year: 2016).*

U.S. Appl. No. 15/691,236 , Advisory Action, dated Jan. 11, 2019, 5 pages.

U.S. Appl. No. 15/691,236 , Final Office Action, dated Sep. 14, 2018, 24 pages.

U.S. Appl. No. 15/691,236 , Non-Final Office Action, dated Feb. 26, 2018, 20 pages.

U.S. Appl. No. 15/691,236 , Non-Final Office Action, dated Jan. 24, 2020, 26 pages.

U.S. Appl. No. 15/691,236 , Notice of Allowance, dated Jul. 24, 2020, 10 pages.

Gama et al., "Learning with Drift Detection", Conference Paper in Intelligent Data Analysis, vol. 8, Sep. 2004, pp. 286-295.

Talwalkar et al., "MLbase: A Distributed Machine Learning Wrapper", NIPS Big Learning Workshop, 2012, 8 pages.

Thornton et al., "Auto-Weka: Combined Selection and Hyperparameter Optimization of Classification Algorithms", Available Online at arxiv.org, Mar. 6, 2013, 9 pages.

* cited by examiner

```
import json  # import the 'json' module

# The one or more parameters are in a JSON file format in this example. The load function
# loads the request content and creates an array that is a collection of name/value pairs. The
# 'json_request' points to the string of parameters passed in as model request information.
parsed = json.loads(json_request)

TE=parsed['targetEvent']      # get the parameter 'targetEvent' which identifies the target
column value that is the focus of the model building
IRS=parsed['inputRangeStart'] # get the parameter 'inputRangeStart' which identifies the "start
input column" position in the train data
IRE=parsed['inputRangeEnd']   # get the parameter 'inputRangeEnd' which identifies the "end
input column" position in the train data (e.g., columns beyond the start and end range are
excluded for training)
TD=parsed['trainData']        # get the parameter 'trainData' which identifies the name of the
train data
TC=parsed['targetColumn']     # get the parameter 'targetColumn' which identifies the position
of "target column" in the train data import pandas as pd    # import 'pandas' module (a data management module)

the following 4 rows of code are for loading machine learning modules
from sklearn.cross_validation import train_test_split
from sklearn.tree import DecisionTreeClassifier
from sklearn.metrics import accuracy_score
from sklearn import tree balance_data = pd.read_csv(TD)  # read the train data file and assign "balance_data" variable X = balance_data.values[:, IRS:IRE]  # read all records from the train data as input columns, but
limit to the columns from inputRangeStart to inputRangeEnd
Y = balance_data.values[:,TC]  # read all records from the train data, and read the target column X_train, X_test, y_train, y_test = train_test_split( X, Y, test_size = 0.3, random_state = 44) #
randomly partition the train data into two: train (70%) and test (30%) .

clf_gini = DecisionTreeClassifier(criterion = "gini", random_state = 100,max_depth=3,
min_samples_leaf=5)  # define a decision tree model with some training parameters clf_gini.fit(X_train, y_train)  # actually fit (i.e., train) the model defined in the line above
```

FIG. 15

```
/* the following lines of code is pseudo code that grabs the one or more parameters */
/*******************
read request and
TE = data['targetEvent']
IRS= data['inputRangeStart']
IRE= data['inputRangeEnd']
TD = data['trainData']
TC = data['targetColumn']
INPUTVARS = data['input']
TARGET   = data['target']
********************/

/* create a train dataset based on the variable TD extracted from the model request */
 <<code to create a training dataset based on the csv file whose name is passed in>>

/* below is a SAS model template */

/* invoke logistic regression modeling tool "proc logistic" */
/* store the trained output parameters in SAS dataset thisModel */
proc logistic data=&TD outmodel=thisModel;

/* indicate to SAS System what variables to use as input and target, respectively*/
/* pick link function "glogit" which is used in the process of logistic regression training */
model &TARGET(event="&TE")=&INPUTVARS / link=glogit;

/* execute proc logistic */
run;
```

FIG. 16

```
data train; keep age disease;
do x = 1 to 250;
 r = ranuni(1234);
 age = int(r * 80 + 20);
 if    age < 35 then do; if ranuni(1234)> .98 then disease="Y"; else disease="N"; end;
 else if age < 60 then do; if ranuni(1234)> .90 then disease="Y"; else disease="N"; end;
 else            do; if ranuni(1234)> .70 then disease="Y"; else disease="N"; end;
 output;
end;
run;
data test; keep age disease;
do x = 1 to 100;
 r = ranuni(5678);
 age = int(r * 80 + 20);
 if    age < 35 then do; if ranuni(1234)> .98 then disease="Y"; else disease="N"; end;
 else if age < 60 then do; if ranuni(1234)> .90 then disease="Y"; else disease="N"; end;
 else            do; if ranuni(1234)> .70 then disease="Y"; else disease="N"; end;
 output;
end;
run;

proc export data=train
   outfile="c:\tmp\trainData.csv"
   dbms=csv
   replace;
run;
```

FIG. 17

```
import tensorflow as tf
import numpy as np

# Create 100 phony x, y data points in NumPy, y = x * 0.1 + 0.3
x_data = np.random.rand(100).astype(np.float32)
y_data = x_data * 0.1 + 0.3

# Try to find values for W and b that compute y_data = W * x_data + b (We know that W should
# be 0.1 and b 0.3, but Tensorflow will figure that out for us.)
W = tf.Variable(tf.random_uniform([1], -1.0, 1.0))
b = tf.Variable(tf.zeros([1]))
y = W * x_data + b

# Minimize the mean squared errors.
loss = tf.reduce_mean(tf.square(y - y_data))
optimizer = tf.train.GradientDescentOptimizer(0.5)
train = optimizer.minimize(loss)

# Before starting, initialize the variables.  We will 'run' this first.
init = tf.initialize_all_variables()

# Launch the graph.
sess = tf.Session()
sess.run(init)

# Fit the line.
for step in xrange(201):
    sess.run(train)
    if step % 20 == 0:
        print(step, sess.run(W), sess.run(b))
```

FIG. 18

```
# Import libraries and modules
import numpy as np
np.random.seed(123)  # for reproducibility from keras.models import Sequential
from keras.layers import Dense, Dropout, Activation, Flatten
from keras.layers import Convolution2D, MaxPooling2D
from keras.utils import np_utils
from keras.datasets import mnist

# Load pre-shuffled MNIST data into train and test sets
(X_train, y_train), (X_test, y_test) = mnist.load_data()
# Pre-process input data
X_train = X_train.reshape(X_train.shape[0], 1, 28, 28)
X_test = X_test.reshape(X_test.shape[0], 1, 28, 28)
X_train = X_train.astype('float32')
X_test = X_test.astype('float32')
X_train /= 255
X_test /= 255
# Pre-process class labels
Y_train = np_utils.to_categorical(y_train, 10)
Y_test = np_utils.to_categorical(y_test, 10)

# Define model architecture
model = Sequential()
model.add(Convolution2D(32, 3, 3, activation='relu', input_shape=(1,28,28)))
model.add(Convolution2D(32, 3, 3, activation='relu'))
model.add(MaxPooling2D(pool_size=(2,2)))
model.add(Dropout(0.25))
model.add(Flatten())
model.add(Dense(128, activation='relu'))
model.add(Dropout(0.5))
model.add(Dense(10, activation='softmax'))

# Compile model
model.compile(loss='categorical_crossentropy',optimizer='adam', metrics=['accuracy'])

# Fit model on training data
model.fit(X_train, Y_train, batch_size=32, nb_epoch=10, verbose=1)
# Evaluate model on test data
score = model.evaluate(X_test, Y_test, verbose=0)
```

FIG. 19

AUTOMATED COMPUTER-BASED MODEL DEVELOPMENT, DEPLOYMENT, AND MANAGEMENT

REFERENCE TO RELATED APPLICATION

This application is a continuation of and claims the benefit of priority to U.S. application Ser. No. 15/691,236, filed Aug. 30, 2017, which claims the benefit of priority under 35 U.S.C. § 119(e) to U.S. Provisional Patent Application No. 62/382,163, filed Aug. 31, 2016, and U.S. Provisional Patent Application No. 62/397,997, filed Sep. 22, 2016, the entirety of each of which is hereby incorporated by reference herein.

TECHNICAL FIELD

The present disclosure relates generally to managing software components and modeling. More specifically, but not by way of limitation, this disclosure relates to various improvements in computer-based model development, deployment, and management.

BACKGROUND

Machines can use models to analyze data from sensors and other electronic devices to derive important information from the data. This information can be used to control how the machine operates. For example, a robot may use a model to analyze inputs from cameras or depth sensors to identify objects, which can enable the robot to avoid colliding with the object while navigating through the world. Some models can include complex expressions and data, which can be static or dynamic. For example, one type of a model can be a neural network, which can include a mathematical expression or relationship that can be tuned (e.g., can "learn", as in machine-learning) over time to improve performance and accuracy. But models can be challenging to develop and maintain, which can result in a variety of problems for machines that rely on such models.

SUMMARY

In some examples, a system of the present disclosure can include a processing device and a memory device on which instructions that are executable by the processing device are stored. The instructions can cause the processing device to select a model building tool from among a plurality of model building tools based on the model building tool being compatible with one or more parameters of (i) a machine learning model or (ii) training data usable to train the machine learning model. The plurality of model building tools can be available for use in generating machine learning models. The instructions can cause the processing device to generate a first machine-learning model using the model building tool by providing the one or more parameters to the model building tool. The instructions can cause the processing device to train the first machine-leaning model using a training dataset. The instructions can cause the processing device to use the first machine-learning model to perform a particular task. The instructions can cause the processing device to perform one or more other operations subsequent to using the first machine-learning model to perform the particular task. For example, the instructions can cause the processing device to receive a new model-building tool. The instructions can cause the processing device to incorporate the new model-building tool into the plurality of model building tools. The instructions can cause the processing device to select the new model-building tool from among the plurality of model building tools based on the new model-building tool being compatible with the one or more parameters. The instructions can cause the processing device to generate a second machine-learning model using the new model-building tool by providing the one or more parameters to the new model-building tool. The instructions can cause the processing device to train the second machine-learning model using the training dataset. The instructions can cause the processing device to provide an input value from the training dataset to the first machine-learning model to determine a first output from the first machine-learning model. The instructions can cause the processing device to provide the input value from the training dataset to the second machine-learning model to determine a second output from the second machine-learning model. The instructions can cause the processing device to compare the first output from the first machine-learning model and the second output from the second machine-learning model to an output value in the training dataset to determine whether the first output or the second output is closer to the output value in the training dataset. The output value in the training dataset can be correlated to the input value in the training dataset. The instructions can cause the processing device to, based on determining that the second output is closer to the output value in the training data than the first output, use the second machine-learning model to perform the particular task rather than the first machine-learning model.

In another example, a non-transitory computer-readable medium can include instructions that are executable by a processing device for causing the processing device to perform operations. For example, the instructions can cause the processing device to select a model building tool from among a plurality of model building tools based on the model building tool being compatible with one or more parameters of (i) a machine learning model or (ii) training data usable to train the machine learning model. The plurality of model building tools can be available for use in generating machine learning models. The instructions can cause the processing device to generate a first machine-learning model using the model building tool by providing the one or more parameters to the model building tool. The instructions can cause the processing device to train the first machine-leaning model using a training dataset. The instructions can cause the processing device to use the first machine-learning model to perform a particular task. The instructions can cause the processing device to perform one or more other operations subsequent to using the first machine-learning model to perform the particular task. For example, the instructions can cause the processing device to receive a new model-building tool. The instructions can cause the processing device to incorporate the new model-building tool into the plurality of model building tools. The instructions can cause the processing device to select the new model-building tool from among the plurality of model building tools based on the new model-building tool being compatible with the one or more parameters. The instructions can cause the processing device to generate a second machine-learning model using the new model-building tool by providing the one or more parameters to the new model-building tool. The instructions can cause the processing device to train the second machine-learning model using the training dataset. The instructions can cause the processing device to provide an input value from the training dataset to the first machine-learning model to determine a first output from the first machine-learning model. The instructions can cause the processing device to provide the input value from the training dataset to the second machine-learning model to determine a second output from the second machine-learning model. The instructions can cause the processing device to compare the first output from the first machine-learning model and the second output from the second machine-learning model to an output value in the training dataset to determine whether the first output or the second output is closer to the output value in the training dataset. The output value in the training dataset can be correlated to the input value in the training dataset. The instructions can cause the processing device to, based on determining that the second output is closer to the output value in the training data than the first output, use the second machine-learning model to perform the particular task rather than the first machine-learning model.

In some examples, a method can include selecting a model building tool from among a plurality of model building tools based on the model building tool being compatible with one or more parameters of (i) a machine learning model or (ii) training data usable to train the machine learning model. The plurality of model building tools can be available for use in generating machine learning models. The method can include generating a first machine-learning model using the model building tool by providing the one or more parameters to the model building tool. The method can include training the first machine-leaning model using a training dataset. The method can include using the first machine-learning model to perform a particular task. The method can include subsequent to using the first machine-learning model to perform the particular task, performing one or more other operations. For example, the method can include receiving a new model-building tool. The method can include incorporating the new model-building tool into the plurality of model building tools. The method can include selecting the new model-building tool from among the plurality of model building tools based on the new model-building tool being compatible with the one or more parameters. The method can include generating a second machine-learning model using the new model-building tool by providing the one or more parameters to the new model-building tool. The method can include training the second machine-learning model using the training dataset. The method can include providing an input value from the training dataset to the first machine-learning model to determine a first output from the first machine-learning model. The method can include comparing the first output from the first machine-learning model and the second output from the second machine-learning model to an output value in the training dataset to determine whether the first output or the second output is closer to the output value in the training dataset. The output value in the training dataset can be correlated to the input value in the training dataset. The method can include, based on determining that the second output is closer to the output value in the training data than the first output, using the second machine-learning model to perform the particular task rather than the first machine-learning model. Some or all of the steps of the method can be performed by a processing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 15 is an example of a template according to some aspects.

FIG. 16 is another example of a template according to some aspects.

FIG. 17 is an example of program code for creating a training dataset according to some aspects.

FIG. 18 is an example of an executable version of a template according to some aspects.

FIG. 19 is another example of an executable version of a template according to some aspects.

DETAILED DESCRIPTION

Figure 1:
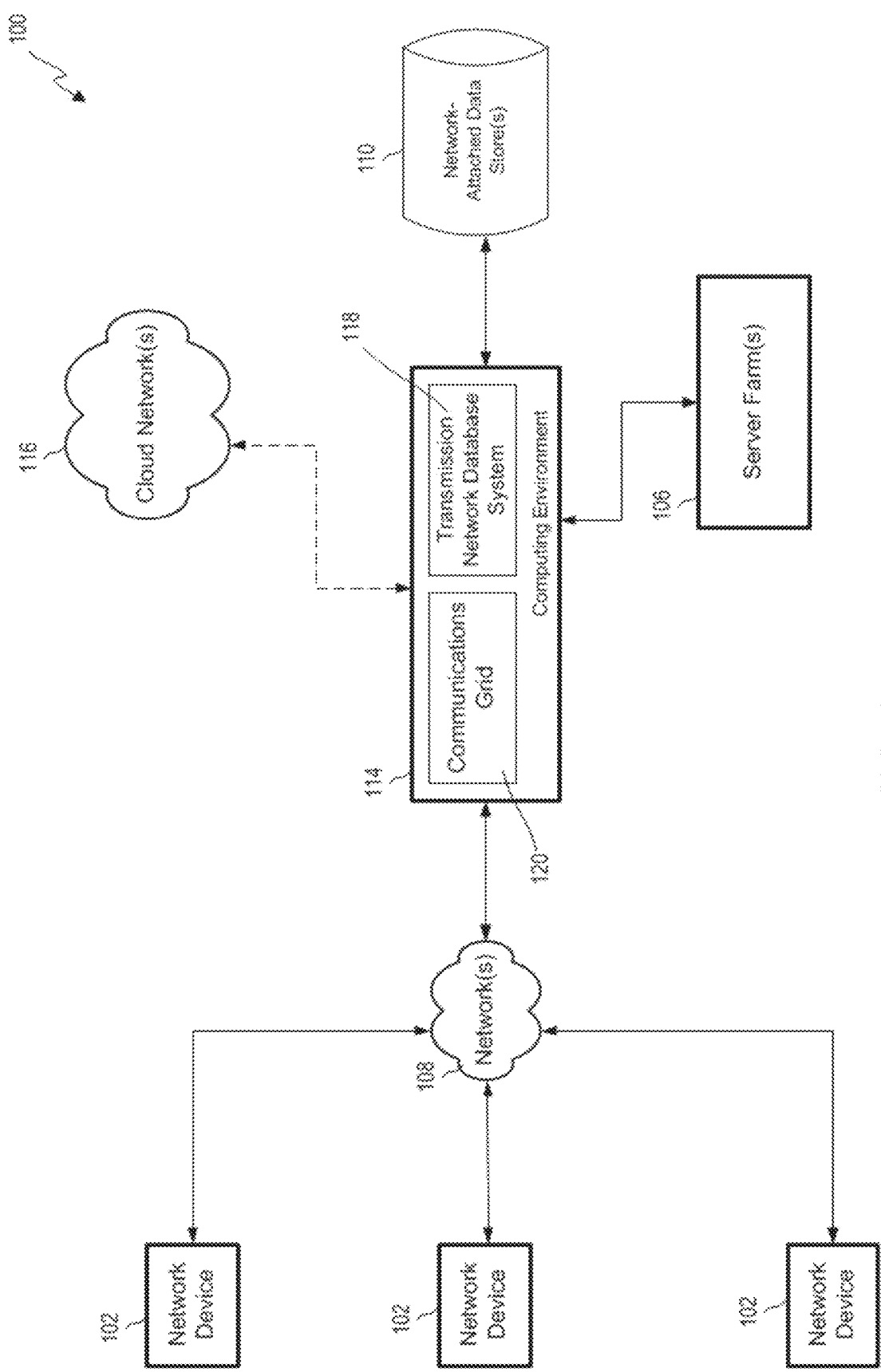
FIG. 1 is a block diagram of an example of the hardware components of a computing system according to some aspects.

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to a system in which models can be developed, deployed, and managed in an at least partially automated manner. This may enable technical and non-technical users to easily incorporate models into machines and other devices. For example, the system can include an interface through which a user can request that a model be built and can select certain high-level parameters for the model. The request can be referred to as a model-building request. The interface can be a graphical user interface (GUI), an application programming interface (API), or another type of interface. The system can receive the model-building request and, in response, perform the necessary lower-level operations to build the model in accordance with the high-level parameters selected by the user. This can provide a layer of abstraction between the user and the model-building process, so that the user need not know the specific details underlying the model-building process (e.g., which model-building tools are used to create the model or how many model-building tools are used to create the model).

In some examples, after a model has been built in response to a model-building request, the system may automatically rebuild or retrain the model in response to certain events occurring internally or externally to the system. For example, as new model-building tools are added to the system, the system can automatically rebuild the model to create a newer version of the model using a newer model-building tool. This can help reduce errors in the models by ensuring that the models are up-to-date, as well as improve the performance and efficiency of such models. As another example, the system can automatically rebuild a model in response to other types of software being added to the system or updated in the system. The system may rebuild the models to, for example, make them compatible with the new or updated software. In some examples, an event external to the system can trigger an automatic rebuild of the model. Examples of an event that is external to the system can include an economic event, regulatory event, legal event, political event, or any combination of these.

In some examples, the system can include multiple model-building tools. Examples of the model-building tools can include Cloud Analytic Services (CAS), SAS™ STAT, Python scikit-learn, H2O, Apache™ Spark, etc. The model-building tools can be on a single computing device or distributed among multiple computing devices. In response to a model-building request, the system can use the multiple model-building tools to generate multiple versions of the model. The system can then compare the multiple versions of the model to identify the best (e.g., most accurate) version of the model, and provide that version of the model for use.

In some examples, the system can pre-process (e.g., analyze, transform, or both) training data that is to be used to train a model. This may enhance the resulting model. For example, the system can analyze the training data to determine a characteristic of the training data. An example of the characteristic can include whether the training data is compatible or incompatible with a certain model or model-building tool. The system can then transform the data in a manner that improves the resulting model.

As a particular example, the system may determine that the training data is compatible with a certain model or model-building tool in its current data format (e.g., an XML format), but would yield better results in a different data format (e.g., a JSON format). The system can then transform the data into the different data format to improve the resulting model. As another example, the system can analyze the training data to determine that the training data has ages of humans as numeric values between 1 and 100. But the system may recognize that certain types of models perform better with ages presented as grouped values rather than individual values. So, the system can transform the training data such that the ages in the training data are presented as belonging to groups, such as (i) 0-25 years old; (ii) 26-50 years old; (iii) 51-75 years old; and (iv) 76-100 years old. For example, the system can update the training data such that any age values between 0-25 years old are replaced with a value signifying group (i), any age values between 26-50 years old are replaced with a value signifying group (ii), any age values between 51-75 years old are replaced with a value signifying group (iii), and any age values between 76-100 years old are replaced with a value signifying group (iv).

Some examples of the present disclosure can result in more accurate and efficient models. For example, by rebuilding and retraining models when new software is added to the system, the system can always have the most accurate and most efficient models for performing tasks. This can also help ensure that the models are compatible with new software.

Also, some examples of the present disclosure can result in significant improvements to a variety of technical fields that rely on models. Examples of such technical fields can include autonomous navigation (e.g., as with a robot or autonomous vehicle using a model-based navigation system), computer-threat prevention (e.g., from viruses and hackers using a model-based computer-threat analysis system), and material molding machines or material curing machines (e.g., using a model-based timing or curing process). More specifically, models can be repeatedly rebuilt as new model-building tools are added to the system. This may result in machines and computers that rely on the models always having the most accurate and computationally efficient models available, enabling such machines and computers to perform tasks in an ever improving manner. As one particular example, a model used to perform computer-threat assessments can be rebuilt and upgraded each time new software is added to the system, or in response to intrusions or intrusion attempts, improving the accuracy and efficiency of the model. This, in turn, can improve the accuracy and efficiency of the computer-threat analysis system.

Some examples of the present disclosure can also result in reduced processing cycles, computation time, and memory usage. For example, newer models may use reduced processing cycles, computation time, and memory usage as compared to older models. Thus, rebuilding models as new model-building tools are added to the system (or upon the occurrence of other events) can help ensure that the fastest and most efficient models are running in the system, thereby constantly improving the performance of the overall system by reducing processing cycles, computation time, and memory usage.

Additionally, some examples of the present disclosure can rely on a set of rules to substantially automate processes that would otherwise need to be performed manually by humans. For example, the system can include templates that have a set of rules (e.g., program code) specific to various model-building tools, whereby each template can have its own set of rules specific to a particular model-building tool. When the user provides high-level parameters for a model to the system, the system can fill in the templates with the high-level parameters to create executable versions of the templates. The system can then provide the executable versions of the templates to the various model-building tools to create (e.g., concurrently in parallel) multiple versions of the model. In this manner, the user need only provide the high-level parameters to the system, and the system can then substantially automate the creation of multiple versions of the model. In some examples, the system may also compare the multiple versions of a model to identify the best model, and make the best model accessible to the user for subsequent use. This is unlike traditional systems, which may require the user to manually create all of the program code for specific a model-building tool, or click through a variety of interfaces in the model-building tool, to create a single model. The user would then have to iterate this process for every model-building tool to create multiple versions of the model, and then manually compare the multiple versions of the model to identify the best model. This is extremely time consuming, difficult, inaccurate, and inefficient.

FIGS. 1-12 depict examples of systems and methods usable for model development and management according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in model development and management, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for model development and management to a network-attached data store 110 for storage. The computing environment 114 may later retrieve the data from the network-attached data store 110 and use the data to deploy and manage a model.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for model development and management.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and computing environment 114, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for model development and management. For example, the computing environment 114, a network device 102, or both can implement one or more versions of the processes discussed with respect to any of the figures.

Figure 2:
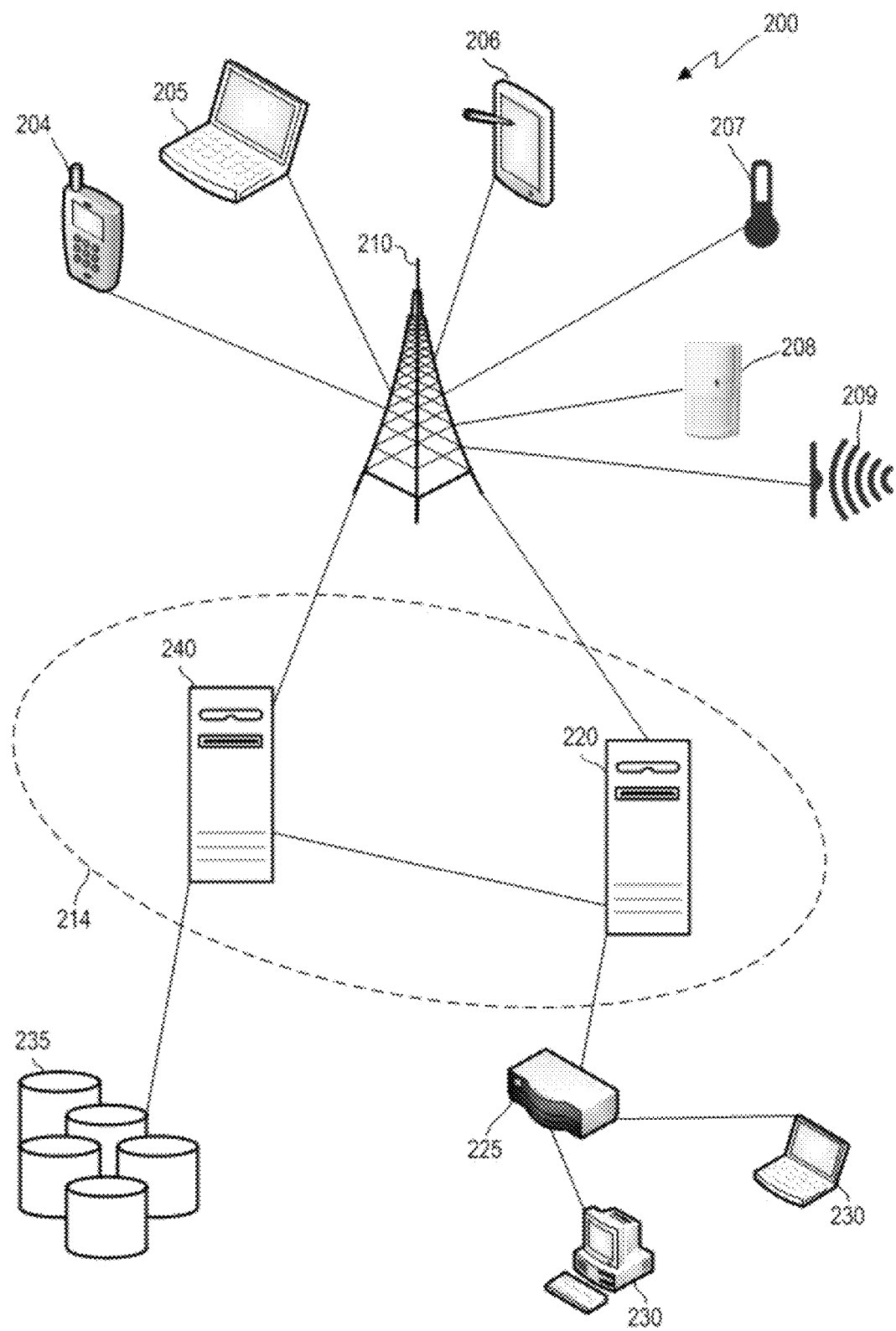
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to manage or deploy a model).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which a model is generated from data, the computing environment 214 can perform a pre-analysis of the data. The pre-analysis can include determining whether the data is in a correct format for creating or deploy the model using the data and, if not, reformatting the data into the correct format.

Figure 3:
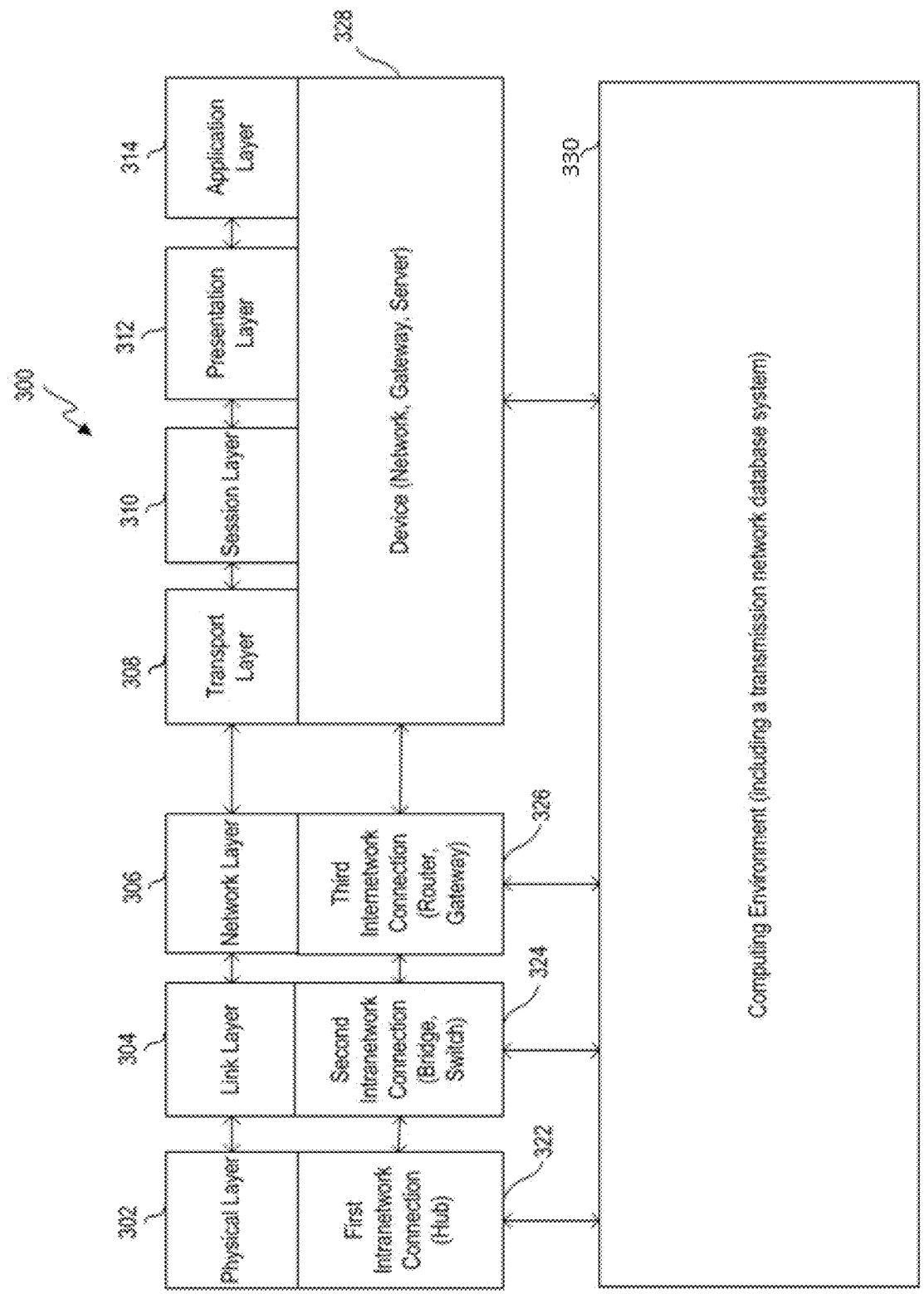
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for model development and management, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for model development and management.

Figure 4:
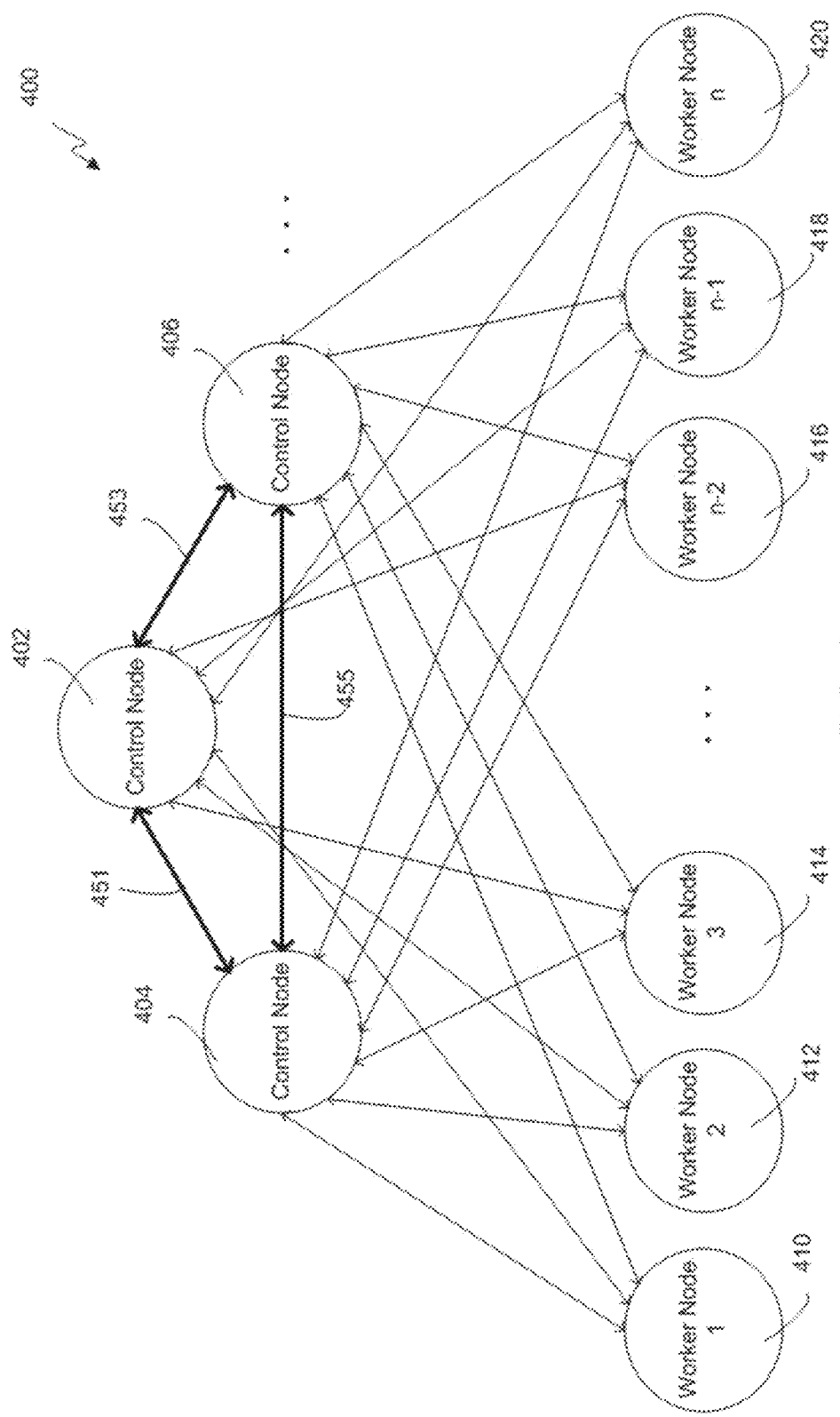
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 410-420 in the communications grid, even if the other worker nodes 410-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to model development and management. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 410-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for deploying or managing a model can be initiated on communications grid computing system 400. A primary control node can control the work to be performed for the project in order to complete the project as requested or instructed. The primary control node may distribute work to the worker nodes 410-420 based on various factors, such as which subsets or portions of projects may be completed most efficiently and in the correct amount of time. For example, a worker node 412 may use at least a portion of data that is already local (e.g., stored on) the worker node. The primary control node also coordinates and processes the results of the work performed by each worker node 410-420 after each worker node 410-420 executes and completes its job. For example, the primary control node may receive a result from one or more worker nodes 410-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 410-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to manage or deploy a model.

Figure 5:
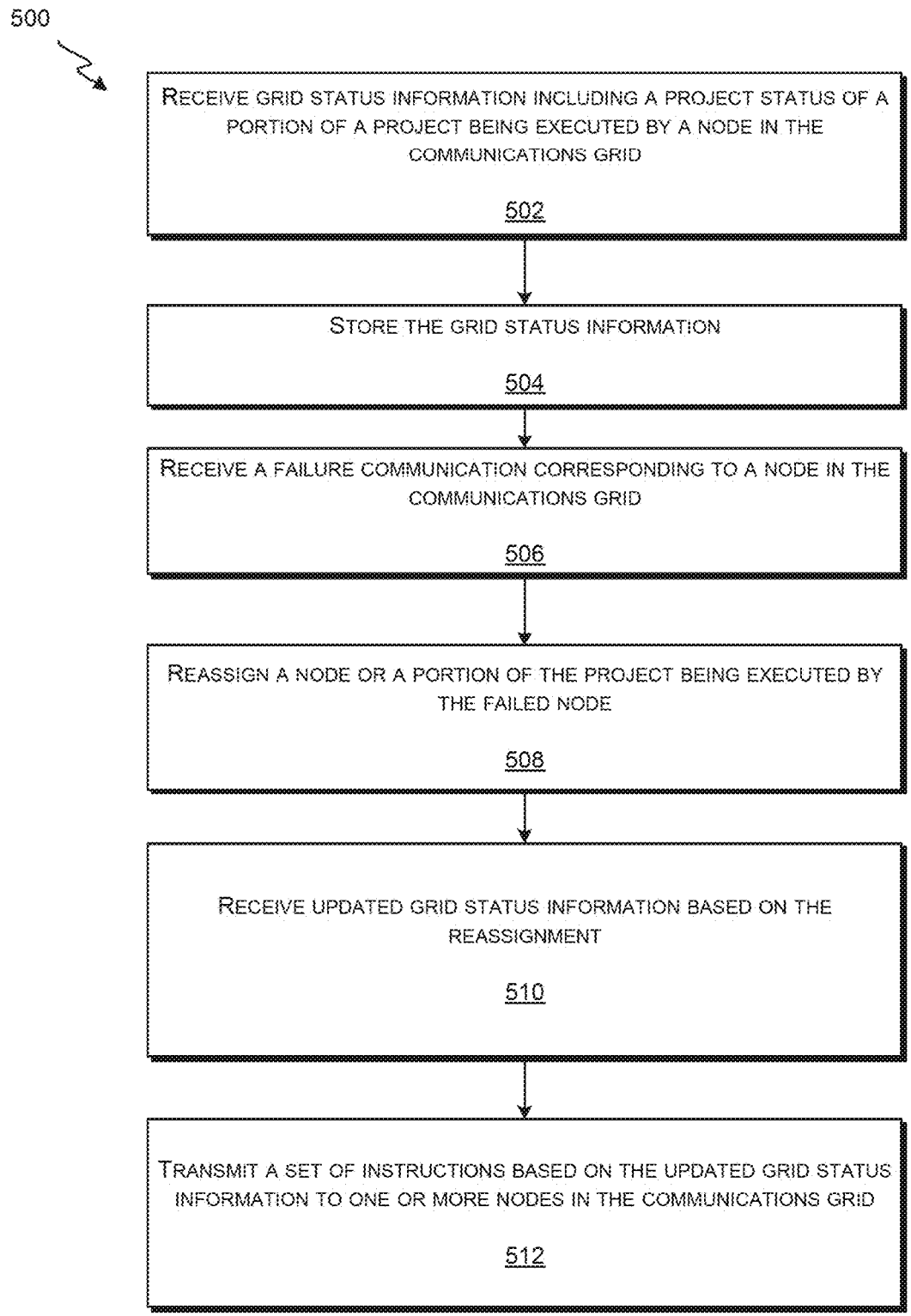
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
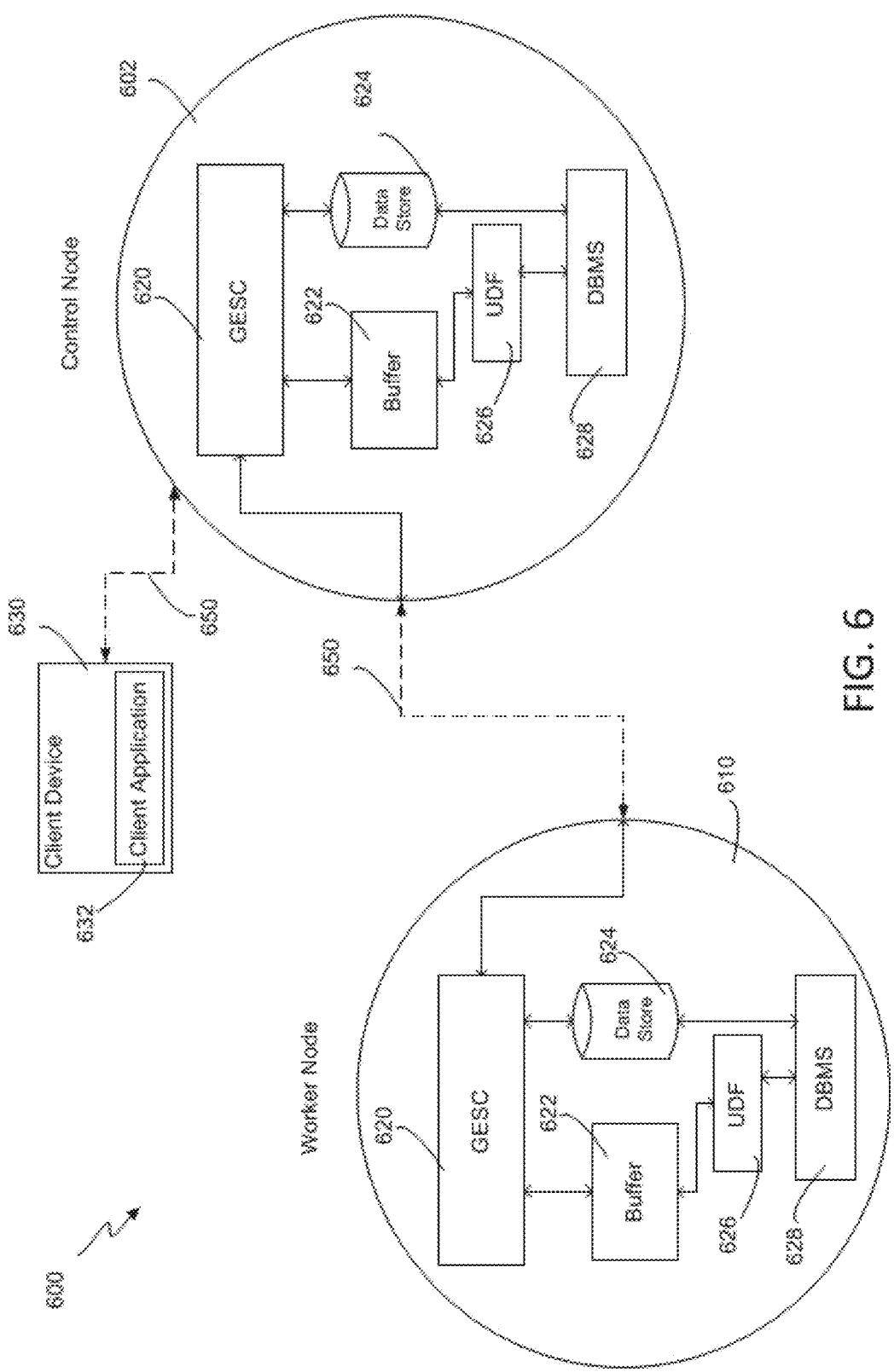
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
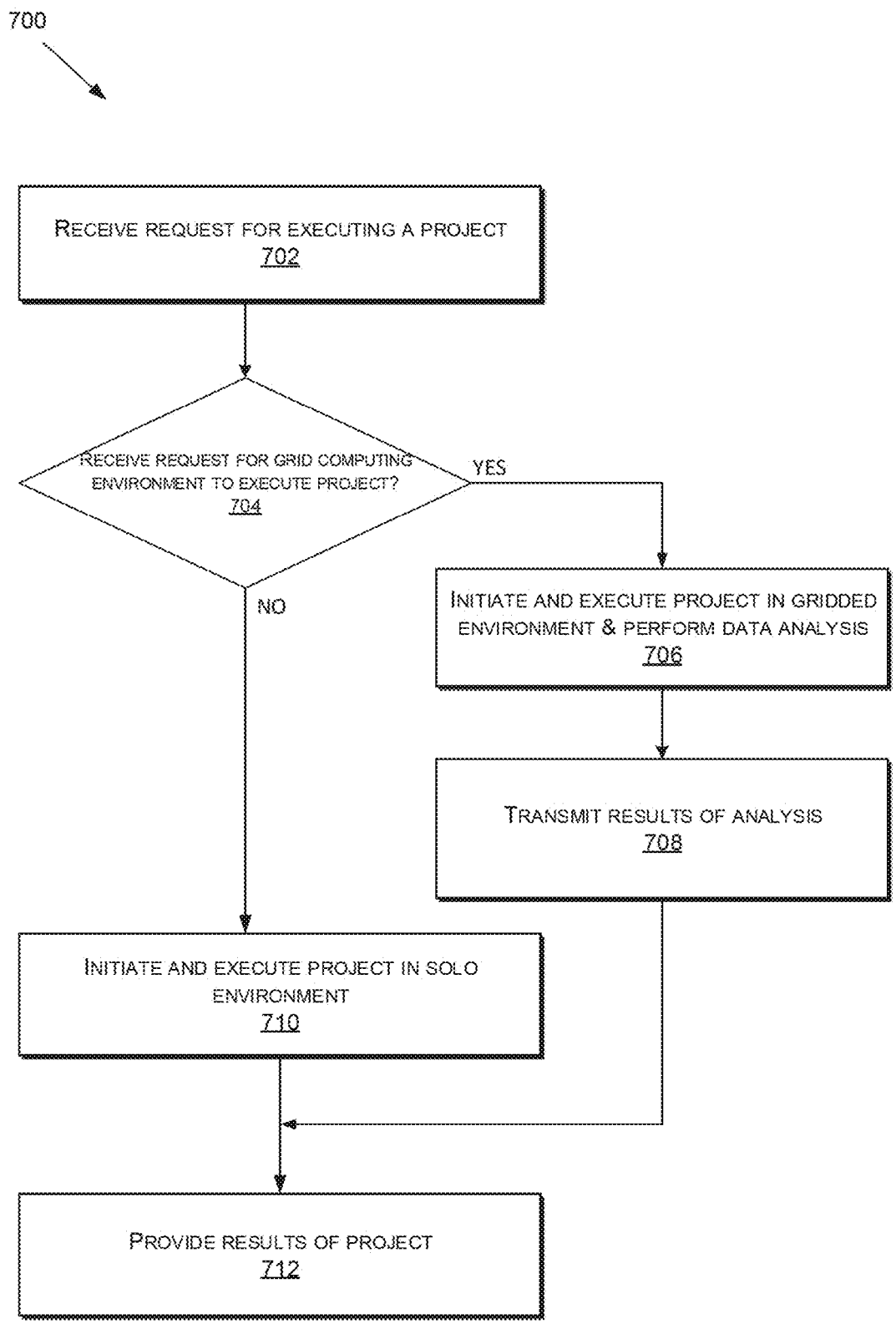
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
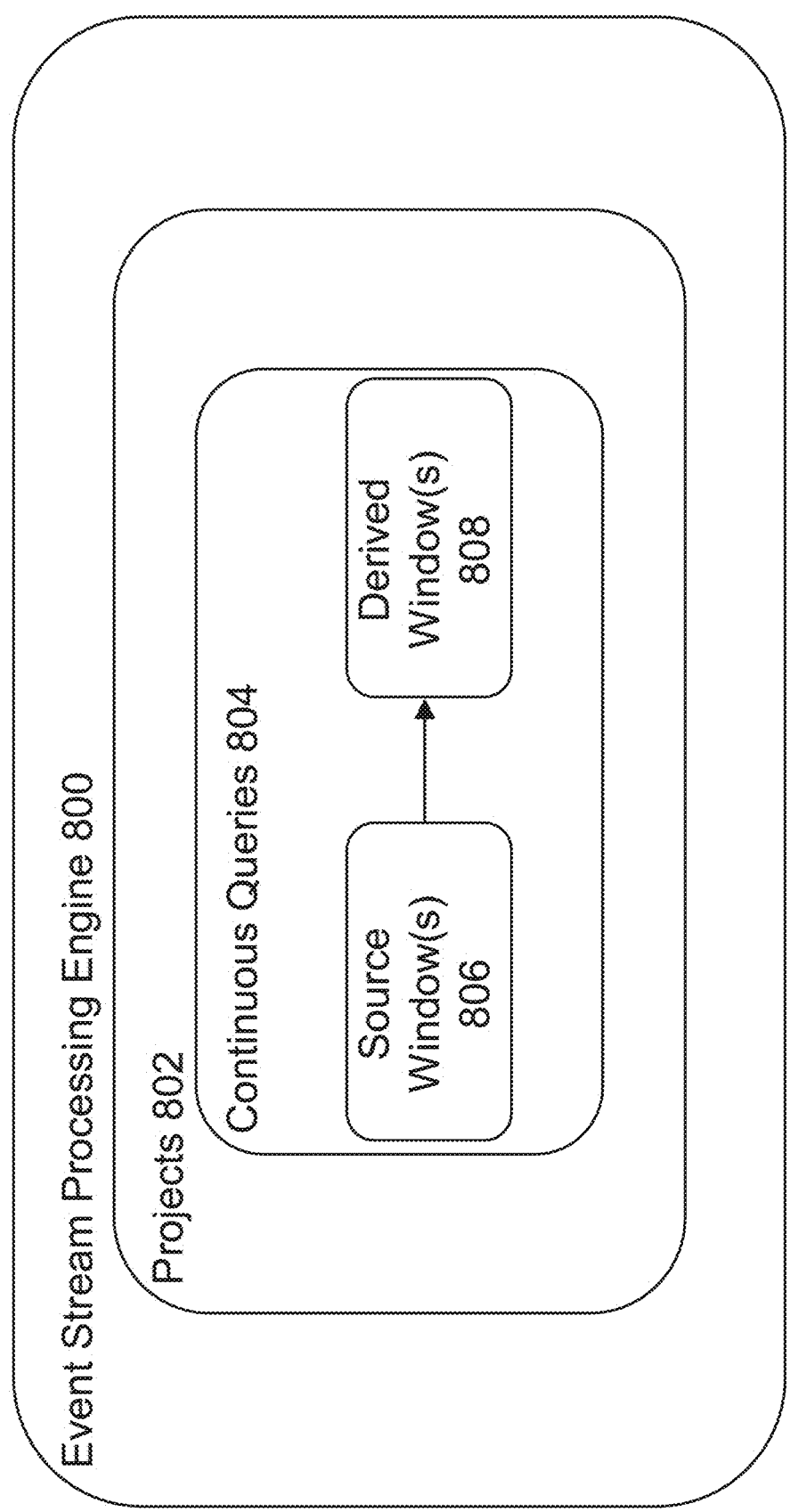
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
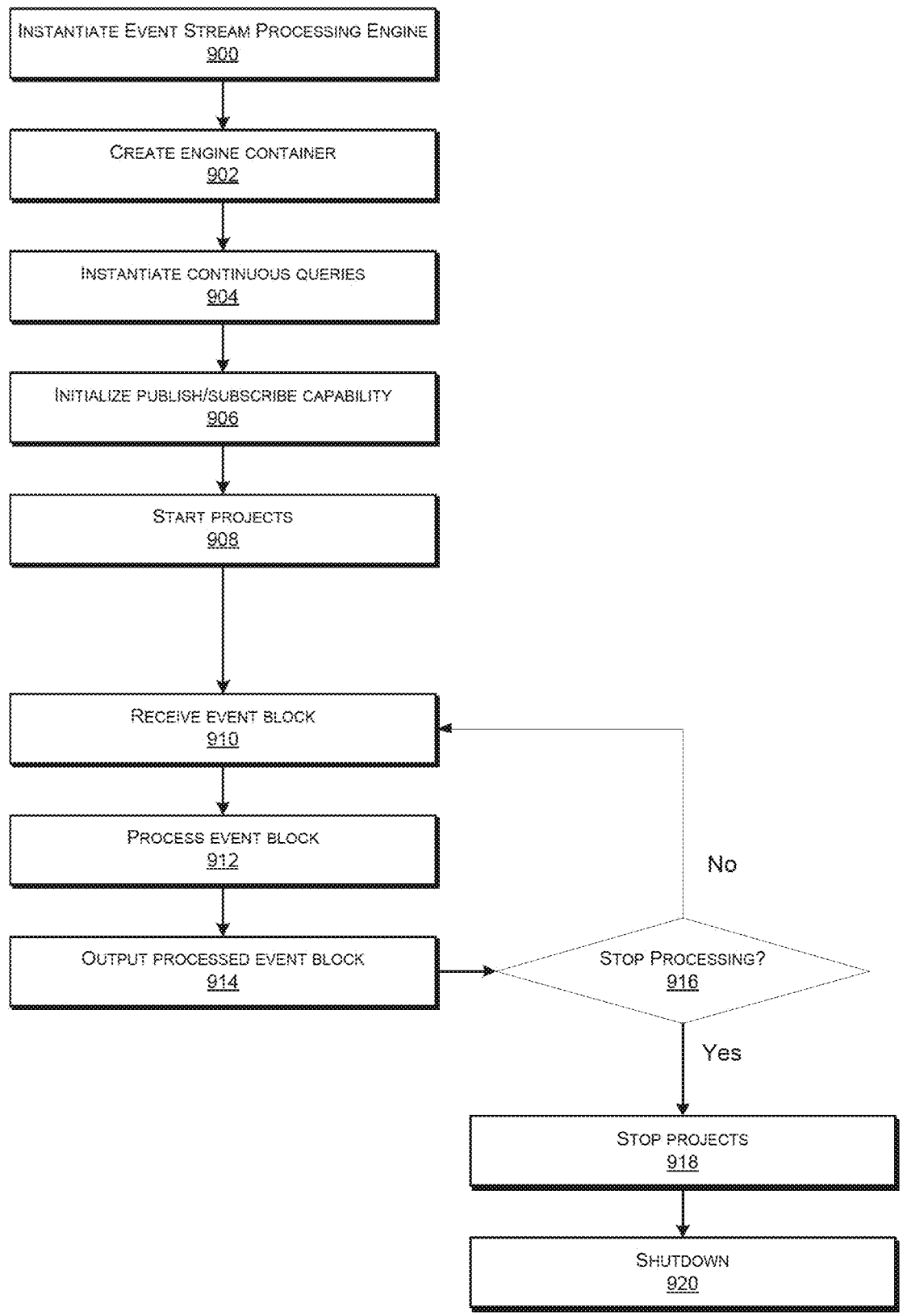
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
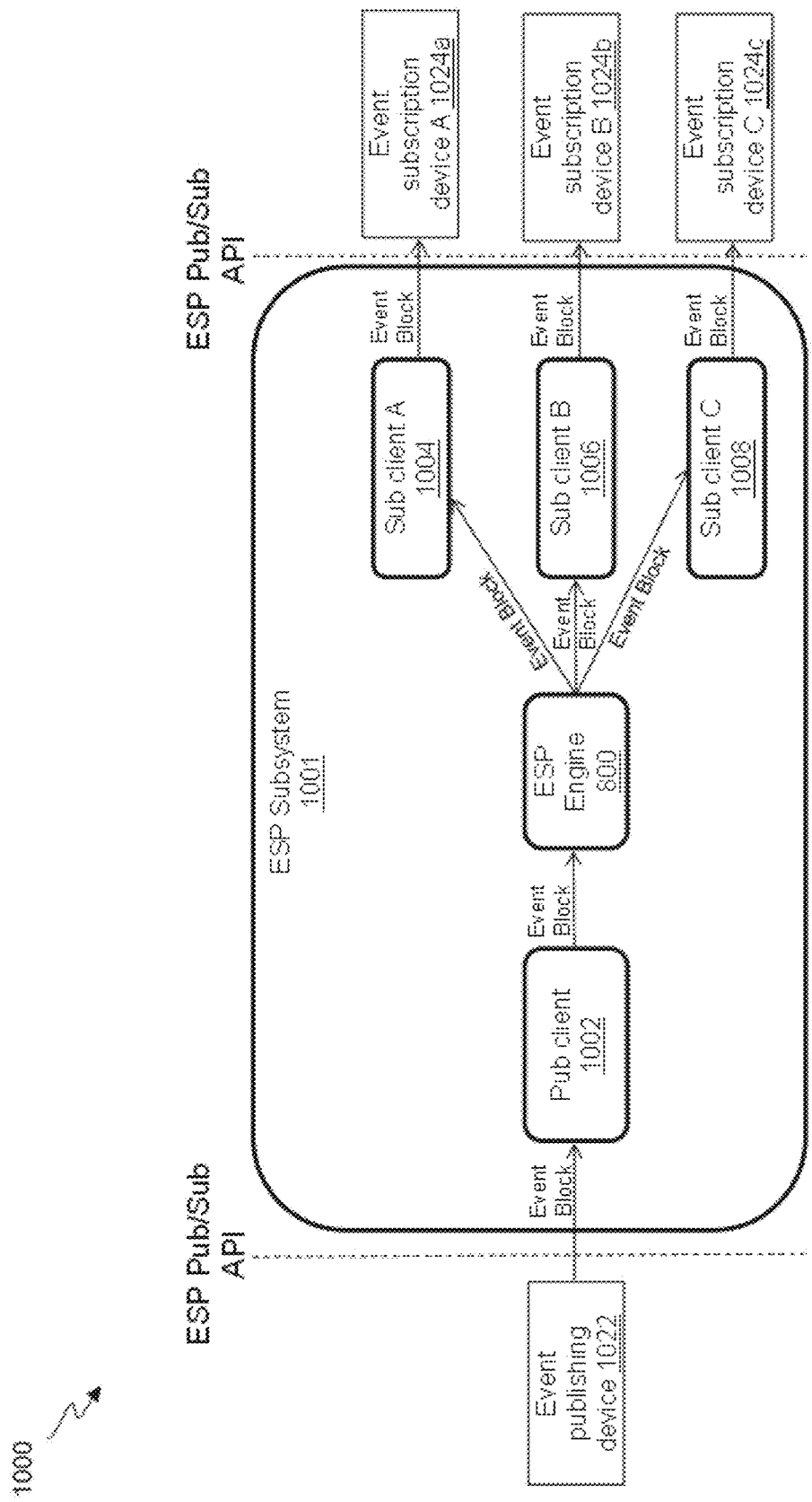
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024*a-c* according to some aspects. ESP system 1000 may include ESP device or subsystem 1001, publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
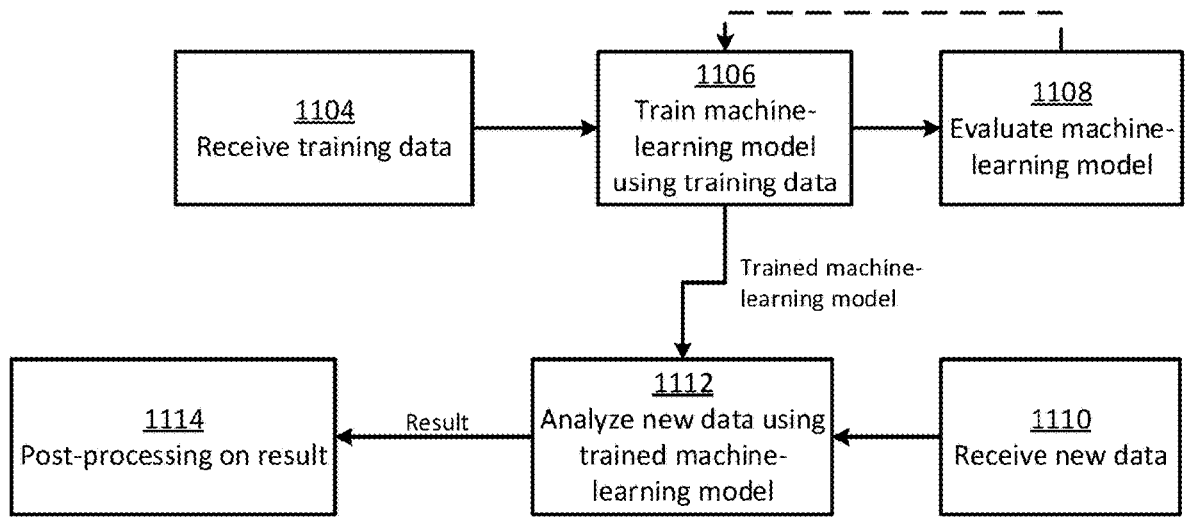
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
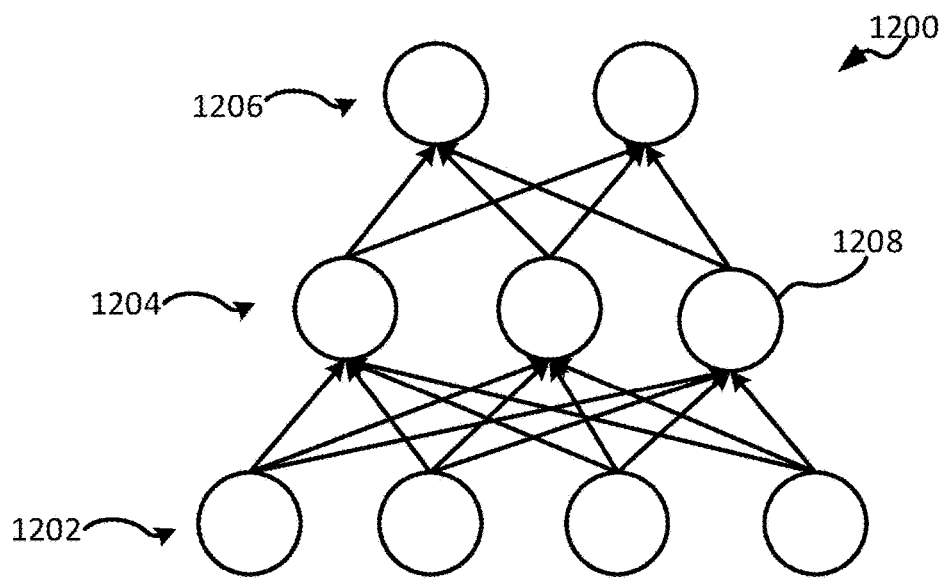
FIG. 12 is an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid, tangent, or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, an Artificial Intelligence (AI) accelerator design, and/or some other machine-learning-specific processor that implements one or more neural networks using semiconductor (e.g., silicon (Si), gallium arsenide (GaAs)) devices.

Figure 13:
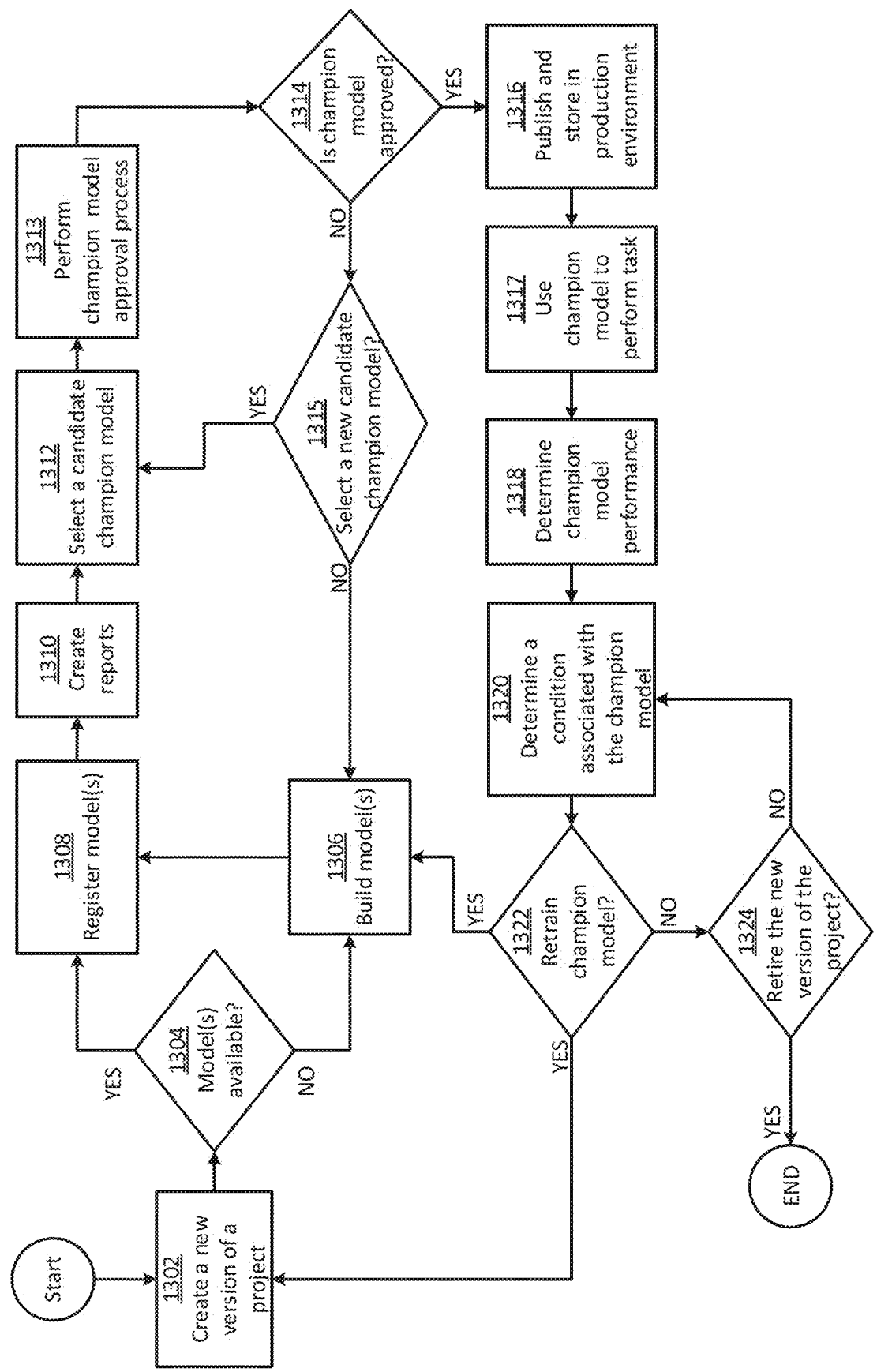
FIG. 13 is a flow chart of an example of a process for developing and managing a model according to some aspects.

FIG. 13 is a flow chart of an example of a process for developing and managing a model according to some aspects. Some examples can include more steps, fewer steps, different steps, or a different order of the steps than depicted in FIG. 13. Some examples can be implemented using any of the systems and processes described with respect to FIGS. 1-12 and 20. The steps below are described with reference to a system for developing and managing models.

In block 1302, the system creates a new version of a project. A project can include one or more files that are collectively used to perform a task, such as analyze computer connections for potential unauthorized intrusions. In some examples, the project relies on at least one model to perform a task.

In some examples, the system can create multiple versions of a project. Each version of the project can be for performing the same task(s), but can have one or more differing characteristics. For example, each version of the project can rely on a different type of model and/or different training data to perform the same task of analyzing computer connections for potential unauthorized intrusions.

The system can create the new version of the project in response to a request from a user or client device. For example, the system can present a user with a graphical user interface (GUI) through which the user can request that the new version of the project be created. The system can receive the request and responsively create the new version of the project. As another example, the system can receive a request in the form of a representational state transfer (REST) command via another type of command. The system can then create the new version of the project in response to the command.

In block 1304, the system determines if the models for the new version of the project are available. If not, the process can proceed to block 1306 where the system can build the model(s). An example of a process for building models is described in greater detail below with respect to FIG. 14.

If the system determines that the model(s) for the new version of the project are available, the process can proceed to block 1308 where the system can register the model(s).

For example, the new version of the project may use multiple models to perform one or more tasks. The system can obtain these models from a repository of existing models and register these models in connection with the new version of the project. For example, the system can update a database to reflect that the model(s) relate to the new version of the project, thereby creating an association between the models and the new version of the project.

In some examples, registering a model can include incorporating one or more files forming the model into a compressed file (e.g., a ZIP file or RAR file). The compressed file can then be registered with the system. For example, the compressed file can be provided to a model-management tool of the system. The model-management tool can receive the compressed file and responsively register the models in the compressed file with the system.

In some examples, registering the model can include storing the file(s) that form the model in a storage device, such as a hard disk, of the system. Additionally or alternatively, registering the model can include storing the file(s) that form the model in a model repository of the system. Any number and combination of techniques can be used to register the model(s).

In block 1310, the system creates reports associated with the new version of the project. The reports can include information about the model(s) included in the new version of the project or the new version of the project itself. For example, a report can include a listing of details related to the new version of the project, the model(s) included in the new version of the project, the training data used to train the model(s), or any combination of these. In some examples, the system can determine the details about the model(s) and incorporate the details into a report. For example, the system can test the models under a variety of test conditions and include information related to the accuracy of the models under the test conditions in a report. The reports can be presented in the form of tables, charts, graphs, or any combination of these, which may make the information more digestible for a user.

In some examples, the system can receive report parameters as user input or from a client device. An example of report parameters can be report definitions, which can be a series of rules to be used to create the reports. The system can then create the reports based on the report parameters. In some examples, the system can receive a selection of details to be included in reports and create the reports based on the selected details.

In block 1312, the system selects a candidate champion model to be used with the new version of the project. For example, the system can create multiple versions of the model, which can be referred to as candidate models. The system can then compare the candidate models to determine the best model among multiple candidate models according to a predefined criterion. The system can then select the best model as the candidate champion model, and use the candidate champion model to perform one or more tasks associated with the project.

As a particular example, the new version of the project may call for a model that is capable of analyzing text (e.g., tweets, text messages, online reviews, etc.) to determine the sentiment expressed in the text. The request to create the new version of the project may include high-level parameters for the model, such as that (i) the model is to be a neural network and (ii) the neural network is to be trained using a particular set of training data. The system can receive the high-level parameters and generate multiple (e.g., 10, 50, or 100) versions of the neural network (e.g., in block 1306).

Each version of the neural network can have different characteristics. For example, some versions of the neural network can be recurrent while other versions of the neural network can be feed-forward only. As another example, the different versions of the neural network can have different numbers of hidden layers, different numbers of neurons per hidden layer, different total numbers of neurons, or any combination of these. The system can then compare the different versions of the neural network to determine which version of the neural network is best for determining sentiment expressed in text. For example, the system can train all of the different versions of the neural network using the same training data, and then test all of the different versions of the neural network using the same testing dataset to determine the accuracy of each version of the neural network. The system can then select the most accurate version of the neural network as the candidate champion model.

In some examples, the system can select as the candidate champion model (i) the most accurate model among the candidate models, (ii) the model that requires the least amount of computation time among the candidate models, (iii) the model that requires the least amount of memory usage among the candidate models, (iv) the model that requires the least amount of processing power or processing cycles among the multiple candidate models, (v) the model that is most easily interpreted according to predefined criteria, (vi) the model that has a least amount of predictors, or (vii) any combination of these. The system can select more than one candidate champion model in some examples.

In block 1313, the system performs a champion model approval process. During the champion model approval process, the system can compare aspects of the candidate champion model to predefined criteria to ensure the candidate champion model meets the predefined criteria. Examples of the predefined criteria can include (i) an accuracy threshold, (ii) a processing-power threshold, (iii) a memory usage threshold, (iv) compliance with a regulatory standard, (v) compliance with an organizational standard or rule, (vi) compliance with a legal rule, (vii) compliance with a user-defined rule, (viii) compliance with a system-defined rule, or (ix) any combination of these.

For example, although the candidate champion model may be the best among the candidate models, the candidate champion model may still be insufficient to perform one or more tasks to implement the new version of the project. For instance, the candidate champion model may not meet an accuracy threshold, may require too much computation time, or may require too much memory to perform a particular task. In some such examples, the system can disapprove the candidate champion model for use in the new version of the project.

In block 1314, the system determines if the candidate champion model was approved or disapproved. If the candidate champion model was disapproved, the process can proceed to block 1315, where the system can determine if a new candidate champion-model is to be selected (e.g., based on a predefined criterion). If so, the process can return to block 1312. If a new candidate champion-model is not to be selected, the process can return to block 1306, where the system may attempt to modify or refine the candidate champion model to overcome the issue that lead to the disapproval. For example, if the candidate champion model was disapproved for being too inaccurate, the system can further train the candidate champion model until the candidate champion model is sufficiently accurate. As another example, if the candidate champion model was disapproved for failing to meet a regulatory standard, the system can modify the candidate champion model to meet the regulatory standard. In some examples, in block 1306, the system may build one or more new versions of the model, disregard the candidate champion model, or both. The new version(s) of the model can subsequently be compared in block 1312 to determine a new candidate champion-model, which in turn can go through the champion model approval process of block 1313. This process can iterate until a suitable champion model is identified.

If the candidate champion model was approved, the process can proceed to block 1316, at which point the candidate champion model becomes the champion model for the project. In block 1316, the system can publish the champion model in a production environment, store the champion model in the production environment, or both. In some examples, the production environment can be a client-facing portion (e.g., user-facing portion or client-device facing portion) of the system. For example, steps 1304-1315 may be performed on a backend of the system that is inaccessible to a user or client device. But after the champion model has been approved, the champion model may then be published or stored in the production environment, which is accessible to the user or the client device. The user or client device can then access (e.g., via a GUI or API) the champion model and use the champion model to perform tasks.

In block 1317, the system uses the champion model to perform one or more tasks associated with the project. For example, if the project is for analyzing computer connections for potential unauthorized intrusions, the system can use the model to analyze at least one computer connection to determine if the connection is authorized or unauthorized, or has other indicia of an intrusion attempt. As another example, the system can use the champion model to control operation (e.g., physical operation) of a machine, such as a robot.

In block 1318, the system determines the performance of the champion model. For example, the new version of the project can use the champion model to predict values, such as future values from sensors or other electronic devices. The predicted values can then be compared to the actual values from the sensors or other electronic devices to determine the accuracy of the champion model. In some such examples, if the accuracy of the mode is high, the champion model can be assigned a high performance score, and if the accuracy of the model is low, the champion model can be assigned a low performance score.

The system can compute any number and combination of performance metrics for the champion model. In some examples, the performance metrics can be referred to key performance indices (KPIs), which can be preset by the user. Examples of KPIs can include an accuracy of the champion model over a predesignated period of time, a speed with which the champion model can generate an output in response to an input, an acceptable amount of drift in an output value over a predesignated period of time, a stability of the model in response to various inputs, or any combination of these. The system can assign a high performance score to the champion model if the KPIs satisfy one or more predetermined criteria, or a low performance score to the champion model if the champion model does not satisfy the one or more predetermined criteria. For example, the system can determine that the champion model has an accuracy that is below a predetermined threshold. Based on this determination, the system can assign the champion model a low performance score, abandon the champion model, temporarily stop using the champion model, or any combination of these.

The system may output the performance (e.g., KPIs) of the champion model in a report or a dashboard, such as a website dashboard that is accessible to the user or client device. The dashboard or report can include tables, charts, or other graphical elements that indicate the performance of the champion model. In some examples, the system can receive report parameters as input and create the report based on the report parameters. For example, the system can receive a selection of KPIs as user input. The system can then generate a report that includes the selected KPIs.

In block 1320, the system determines a condition associated with the champion model. The condition may indicate that the champion model should be retrained or rebuilt. In some examples, the condition includes a change in an output of the champion model. For example, the condition can include the output from the champion model changing from one value to another value in response to the same inputs (e.g., within the predefined period of time). As another example, the condition can include the output from the champion model changing by more than a threshold amount in response to the same inputs. As yet another example, the condition can include a KPI being above or below a predefined threshold, or otherwise failing to satisfy a predefined criteria. The system may identify the condition by comparing a current output from the champion model against another value, such as a prior output (e.g., produced while training or testing the champion model, or that occurred within a predefined timespan from the current output).

In some examples, the condition includes a change in an input to the model. For example, prior inputs to the champion model may have had a large amount of positive sentiment about an object. Current inputs to the champion model may include a large amount of negative sentiment about the object. This shift in sentiment may cause the champion model to perform poorly, as some models may be better at identifying positive sentiment than negative sentiment (or vice-versa). The system may identify the condition by comparing a current input into the champion model against another value, such as a prior input (e.g., from training data or testing data, or that occurred within a predefined timespan). As another example, inputs to the champion model can include sensor values, economic factors (e.g., an unemployment rate), or political factors (e.g., a current president). The condition can include a shift in these values or factors by amounts that are more than a predefined amount. For example, the condition can be a change in sensor values by more than 10%.

In block 1322, the system determines if the champion model is to be retrained or rebuilt. The system can determine if the champion model is to be retrained or rebuilt based on the condition associated with the champion model. For example, the system can automatically (e.g., with minimal or no human intervention) detect the condition and, in response, determine that the champion model is to be retrained or rebuilt. Additionally or alternatively, the system can determine that the champion model is to be retrained or rebuilt based on (i) a user configuration; (ii) factors that are internal or external to the system, such as a regulatory or legal change; (iii) degradation of the champion model, (iv) the availability of input data for the champion model; (v) a predefined amount of time passing (e.g., one month); or (vi) any combination of these.

In some examples, the system can analyze outputs from the champion model to determine a frequency at which to retrain the champion model, and then retrain the champion model at that frequency. For example, the system can analyze the outputs of the champion model to determine that, for example, the outputs from the champion model drift by an unacceptable amount every 6 months. So, the system can determine that the champion model is to be retrained every 6 months. The system can then retrain the champion model every 6 months. This can help ensure that the champion model remains accurate.

If the system determines that the champion model is to be retrained or rebuilt, the process can proceed to block 1302 or to block 1306. In block 1302, the system may create a new version of the project in which a retrained version of the champion model or a rebuilt version of the champion model is used. In block 1306, the system may retrain or rebuild the existing champion model for use in the current version of the project.

If the system determines that the champion model is not to be retrained or rebuilt, the process can proceed to block 1324, where the system can determine if the new version of the project is to be retired. For example, the system can receive input from a user or client device indicating that the new version of the project is no longer being used. The system can respond to the input by determining that the project is to be retired. As another example, if the system creates yet another version of the project after determining that the champion model is to be retrained in block 1322, the system can determine that the existing version of the project is to be retired. Retiring the new version of the project can include deleting the new version of the project, removing the new version of the project from the production environment, moving the new version of the project to a repository of retired or unused versions of the project, or any combination of these.

If the system determines that the new version of the project is to be retired, the system can retire the new version of the project and the process may end. If the system determines that the new version of the project is not to be retired, the process can return to block 1320 (or another block) and iterate.

In some examples, the system can receive a new model-building tool, template, or other software at any point during the process discussed above. This may automatically trigger a retrain or rebuild of the champion model, or the creation of a new model. For example, the system can receive a new model-building tool and incorporate the new model-building tool into a repository of model-building tools in the system. The system can then automatically create a new model using the new model-building tool. The system may create the new model based on one or more parameters used to create the champion model (e.g., as discussed below with respect to block 1402 of FIG. 14). After creating the new model, the system can compare the new model to the existing champion model to determine which of the models is the "best" to use in the new version of the project. For example, the system can provide an input value to the new model and to the champion model, and compare outputs from the new model and the champion model to a desired output value that corresponds to the input value. The system can select, as a new champion model, whichever of the two models has an output that is closest to the desired output value or meets some other predefined criterion. For example, if the new model has an output that is closer to the desired output value than an output from the champion model, the system can select the new model as a new champion model for future use (e.g., in performing a task associated with the new version of the project), disregard the existing champion model, or both of these. This process may iterate each time a new model-building tool is added to the system.

A system implementing some or all of the process of FIG. 13 can enable high volume of models, such as thousands or millions of models, to be developed and managed in a substantially automated manner. The system can create, compare, and update models as needed, thereby helping to ensure that the most appropriate model is used to perform a task at any given instance in time.

Figure 14:
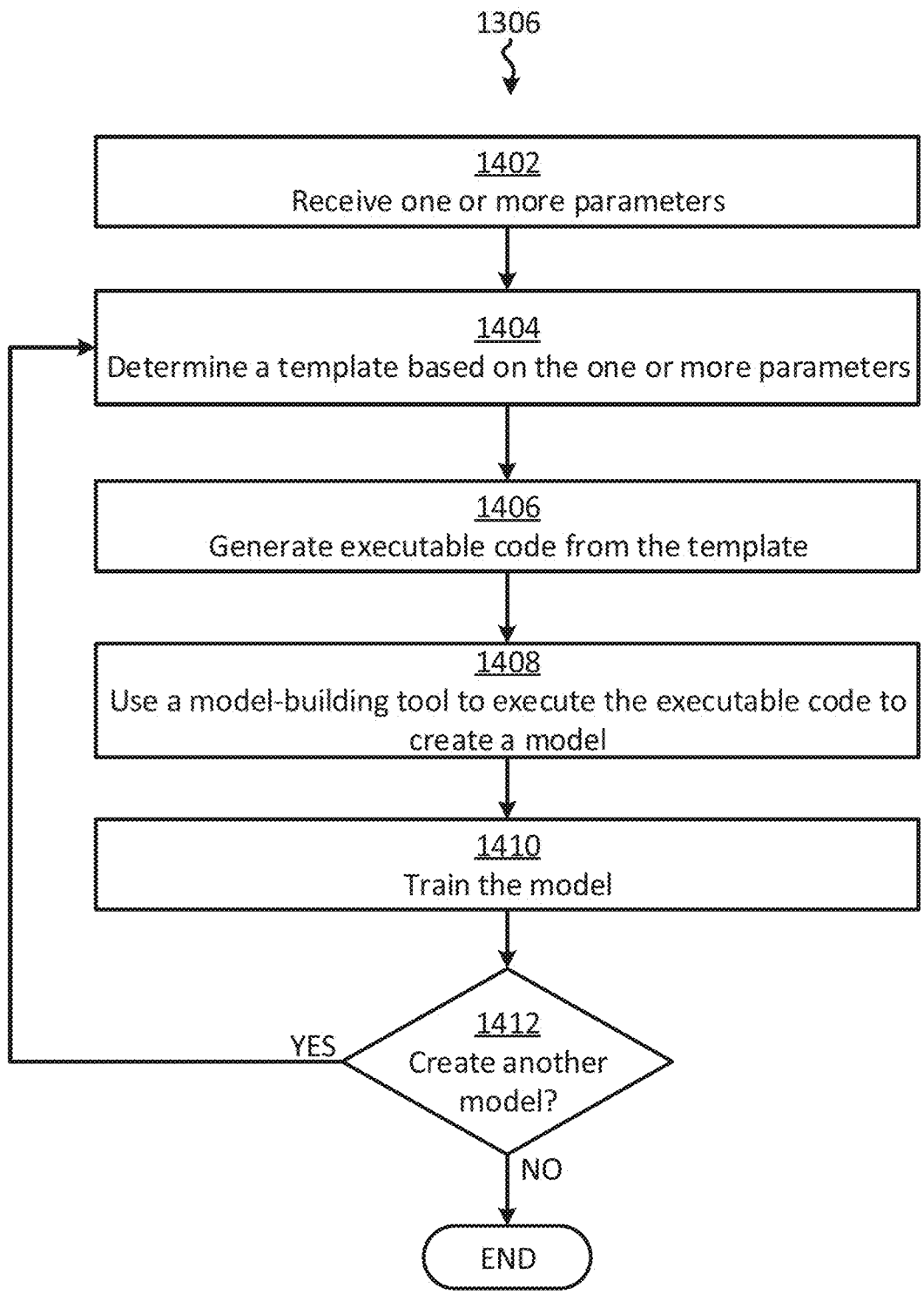
FIG. 14 is a flow chart of an example of a process for building a model according to some aspects.

FIG. 14 is a flow chart of an example of a process for building a model according to some aspects. Some examples can include more steps, fewer steps, different steps, or a different order of the steps than depicted in FIG. 14. The steps below are described with reference to a system for developing and managing models.

In block 1402, the system receives one or more parameters. In some examples, the system can receive the parameters as user input or from a client device (e.g., as part of a model-building request). The parameters can define aspects of a model, model-building tool, training data, or any combination of these. Examples of a parameter can include (i) a type of the model, such as a deep neural network, feed-forward neural network, recurrent neural network, or another type of machine-learning model; (ii) a characteristic of the model, such as a number of nodes, hidden layers, connections, or other features of a neural network; (iii) an identifier of a training dataset to be used to train the model; (iv) a format for the training data or a type of training data to be used to train the model; (v) a maximum value that the training dataset is to have; (vi) a minimum value that the training dataset is to have; (vii) a portion of the training dataset to be designated as testing data for testing the accuracy of the model; (viii) a target row or column in a training dataset to be used to train the model; or (ix) any combination of these.

In some examples, the system can determine the one or more parameters. For example, the system can analyze user preferences to determine the one or more parameters. Examples of the user preferences can include an amount of time the system has to build the model, a speed at which the model is to execute, user-defined weights for models or model-building tools, or any combination of these. In one particular example, the system can determine that one parameter is a speed at which the model is to execute and another parameter is a weight for a certain model-building tool.

In some examples, the system can determine the one or more parameters by analyzing historical data, such as how the model performed in the past (e.g., in past projects or past versions of the project). For example, the system may initially determine that a certain type of model is to be used to perform a task, but after analyzing historical data related to past performance of the model, determine that another model or a modified version of the model is more suitable for performing the task. The system can then generate the one or more parameters such that they effectuate creation of the other model or the modified version of the model.

In some examples, the system can determine the one or more parameters based on a computing device included in the system. For example, the one or more parameters can include the available memory, processing power, or other computing resources of a server to be used to create the model. This can help ensure that the server has the capability to create the model.

In block 1404, the system determines a template based on the one or more parameters. The template can include program code that is in a format (e.g., programming language, syntax, or both) that is specific to a particular model-building tool. In some examples, the template has one or more fields that are empty, which can be filled in with the values from the one or more parameters.

In some examples, the system can use the one or more parameters to filter ("intelligently filter") an available list of templates, so that only the templates that are compatible with the one or more parameters are selected and used to create models. This can prevent the system from generate a model using every available template or model-building tool, which is potentially hundreds or thousands of tools.

One example of a template is shown in FIG. 15. The template shown in FIG. 15 includes program code in a programming language (Python) that is compatible with a model-building tool by SAS Institute™. The template may also be in a particular format or have a particular syntax that is compatible with the model-building tool. In this example, the template includes program code for getting the one or more parameters (e.g., targetEvent, inputRangeStart, inputRangeEnd, trainData, and targetColumn), preparing machine-learning modules, obtaining the correct partition(s) of a training dataset, splitting the training dataset into a training partition and a testing partition, and defining and training a decision tree model. In some examples, the program code shown in FIG. 15 can be referred to as a "template" before being run (e.g., before actually retrieving and filling in values for the one or more parameters), and "executable code" after being run (e.g., after the values for the one or more parameters have been retrieved and filled in). This is discussed in greater detail below with respect to block 1406.

Another example of a template is shown in FIG. 16. In this example, the template includes program code for getting the one or more parameters (e.g., targetEvent, inputRangeStart, inputRangeEnd, trainData, targetColumn, input, and target), creating a training dataset, and preparing and using a logistic regression modeling tool. Example program code that can be inserted into the section labeled "<<code to create a training dataset based on the csv file whose name is passed in>>" is shown in FIG. 17.

Examples of executable versions of templates are shown in FIGS. 18-19. These executable versions of templates are in the same programming language (e.g., Python), but rely on different libraries from one another to create models. For example, the executable version of the template of FIG. 18 relies on a TensorFlow library, whereas the executable version of the template of FIG. 19 relies on a Keras library. Thus, in some examples, the system can include templates or executable versions of templates that are in the same programming language but that rely on different libraries or interfaces, which may be specific to a corresponding model-building tool.

Returning to FIG. 14, in some examples, determining the template includes selecting the template from among multiple templates that are already present in the system. For example, the system can include multiple templates and multiple model-building tools. The templates and model-building tools can be created by the same entity (e.g., computer, person, company, corporation, etc.) or different entities. The templates can be stored in a template repository or elsewhere in the system. Each template can be specific to a respective model-building tool. The system can access some or all of the templates and select the template from among the accessible templates. The system can select the template randomly or based on a particular methodology. In some examples, the system can select the template based on the one or more parameters. For example, a parameter can indicate that a particular model is to be created. But this particular model may only be created using a particular model-building tool. So, the system can select a template that corresponds to the particular model-building tool so that the system can create that particular model. As another example, a parameter can indicate that the computing device to be used to create the model has limited memory availability. So, the system can select a template that is compatible with the limited memory availability (e.g., that is specific to a model-building tool that requires a small amount of memory to run).

Additionally or alternatively, the system can select the template based on a training dataset. For example, the system can identify a training dataset that is to be used to train the model. In such an example, an identifier of the training dataset may be provided as one or the parameters or otherwise provided to the system. The system can analyze the training dataset to determine characteristics of the training dataset. Examples of the characteristics can include (i) a format or type of the training dataset; (ii) a maximum value in the training dataset; (iii) a minimum value in the training dataset; (iv) a portion of the training dataset that is designated as testing data for testing the accuracy of the model; or (v) any combination of these. The system can select a template that is compatible with one or more of the characteristics of the training dataset.

Additionally or alternatively, the system can pre-process the training dataset (e.g., to improve the resulting model) and select a template that is compatible with the pre-processed training dataset. For example, the system can determine that the model will have improved performance if a particular variable in the training dataset is converted from a first format (e.g., a specific age value) into a second format (e.g., an indicator of an age group), and convert the particular variable into the second format. The system can then select a template that is compatible with the particular variable being in the second format.

Additionally or alternatively, determining the template can include generating at least a portion of the template on-the-fly. For example, the system can automatically construct the template using a set of logical rules. The set of logical rules can include relationships between the one or more parameters and segments of program code to be incorporated into the template to form the template. For example, the set of logical rules can include "if statements", in which certain segments of program code are included in the template if particular parameters are present within the one or more parameters, if the one or more parameters have certain predefined values, or both. In some examples, the system can incorporate the values of the one or more parameters into the template as the system is generating the template on-the-fly.

The system can determine the template using any number and combination of techniques. For example, the system select an existing template, extract at least a portion of the program code from the existing template, and create a new template using the extracted portion of the program code as well as additional segments of program code determined according to a set of logical rules. The system can then use the new template.

In block 1406, the system generates executable code from the template. Executable code can be program code that is in a format that is executable by a model-building tool. For example, the system can fill in one or more empty fields in the template with values for the one or more parameters, which can render the template executable by a model-building tool. Additionally or alternatively, the system can compile, reformat, or otherwise transform the template into the executable code. For example, the system can modify a syntax of the template from one format to another format that is executable by a particular model-building tool.

In block 1408, the system uses a model-building tool to execute the executable code to create a model. For example, the template from which the executable code is derived can correspond to a particular model-building tool. The system can provide the executable code to the particular model-building tool, or transmit one or more commands to the particular model-building tool, to cause the particular model-building tool to execute the executable code and generate the model.

The model can define a relationship between input data and output data. For example, the model can be a machine-learning model or another type of model. Input data can be fed into the model and a corresponding output can be received from the model. In some examples, the relationship between the input data and the output data can be created or tuned at least in part by training the model.

In block 1410, the system trains the model. For example, the model can be a machine-learning model. The system can select a training dataset and use the training dataset to train the machine-learning model.

In some examples, the system may select the training dataset based on an identifier or other indicator of the training dataset in the one or more parameters. Alternatively, the system can select the training dataset based on the model to be generated or the model-building tool to be used to generate the model.

In some examples, the system can divide the training dataset into a first portion to be used for training the model and a second portion to be for testing the model. The system can then use the first portion to train the model and the second portion to test the model. The system can use any amount of the training data to train the model.

In block 1412, the system determines if another model (e.g., another version of the model) is to be created. If not, the process may end. If so, the process can return to block 1404, where another template can be selected based on the one or more parameters to create another model.

For example, the system may create multiple models using multiple templates and multiple model-building tools. The system can create the models based on the one or more parameters. This may result in the models having characteristics that are at least partially defined by the one or more parameters. In some examples, the system can then compare the resulting models to determine a champion model (e.g., in block 1312 of FIG. 13). For example, the system can obtain an input value-output value pair from the training data. The input value-output value pair can include an input value for a model and a desired output value from the model in response to the input value. The system can then provide the input value to each of the models and compare the outputs from each of the models to the output value. In some examples, the system can select as the champion model whichever model has an output that is closest to the output value from the input value-output value pair.

Figure 20:
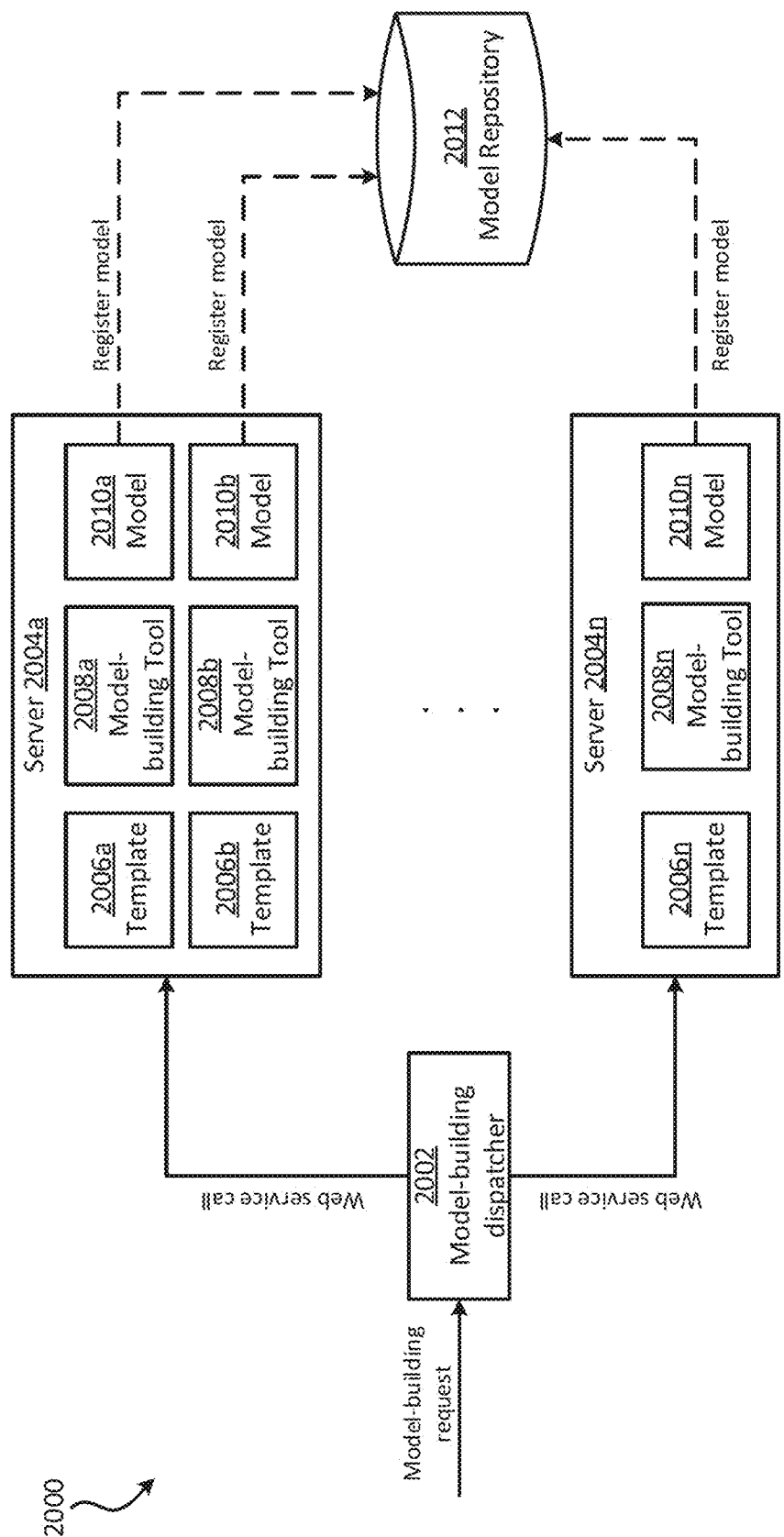
FIG. 20 is block diagram of an example of a system for developing and managing a model according to some aspects.

FIG. 20 is block diagram of an example of a system 2000 for developing and managing a model according to some aspects. In some examples, the system 2000 can implement any process or combination of processes discussed above.

The system 2000 includes a model-building dispatcher 2002 for receiving a model-building request and forwarding the model-building request to a server, such as servers 2004-*n*, capable of handling the model-building request. In some examples, the model-building dispatcher 2002 can be a server that is independent from other servers in the system 2000 and dedicated to managing model-building requests. Alternatively, the model-building dispatcher 2002 can be a part of a server that also performs another function within the system 2000. The model-building dispatcher 2002 can be a hardware component, a software component, or both.

The model-building dispatcher 2002 may communicate model-building requests to the servers 2004*a-n* in the form of web service calls or using other types of commands. A web service call can be a command that is communicated to a server via a hypertext transfer protocol (HTTP), where the command causes the server to execute a function and return a response.

In some examples, the servers 2004*a-n* can include templates 2006*a-n* and model-building tools 2008*a-n*. The servers 2004*a-n* can convert the templates 2006*a-n* into executable code by filling in blanks in the templates 2006*a-n* with one or more parameters in the model-building request. The servers 2004*a-n* can then use the model-building tools 2008*a-n* to execute the executable code and generate models 2010*a-n*. The servers 2004*a-n* can locally store the models 2010*a-n* or store the models in a model repository 2012. The servers 2004*a-n* may additionally or alternatively register the models in the model repository 2012.

The system 2000 of FIG. 20 is shown for illustrative purposes, and other examples can include more or fewer components than are shown in FIG. 20. For example, the system 200 may also include a model-building tool repository and a template repository, with which the servers 2004*a-n* can communicate to obtain or store model-building tools 2008*a-n* and templates 2006*a-n*.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
one or more processing devices; and
one or more memory devices including instructions executable by the one or more processing devices for causing the one or more processing devices to:
receive a request from a client device to build a machine-learning model for use in performing a task as part of a first project, the request including one or more parameters associated with the machine-learning model;
in response to receiving the request, select a first template that is compatible with the one or more parameters included in the request;
based on selecting the first template, convert the first template into first executable code by incorporating the one or more parameters into the first template;
based on converting the first template into first executable code, provide the first executable code as input to a first model-building tool for causing the first model-building tool to build a first machine-learning model in accordance with the one or more parameters, wherein the first model-building tool is software;
based on building the first machine-learning model, incorporate the first machine-learning model into the first project; and
subsequent to incorporating the first machine-learning model into the first project:
select a second template that is compatible with the one or more parameters included in the request;
based on selecting the second template, convert the second template into second executable code by incorporating the one or more parameters into the second template;
based on converting the second template into the second executable code, provide the second executable code as input to a second model-building tool for causing the second model-building tool to build a second machine-learning model based on the one or more parameters, wherein the second machine-learning model is different from the first machine-learning model, and wherein the second model-building tool is software; and
incorporate the second machine-learning model into a second project for use in performing the task as part of the second project.

2. The system of claim 1, wherein the first machine-learning model is a first version of the machine-learning model, and the second machine-learning model is a second version of the machine-learning model.

3. The system of claim 2, wherein the first project is a first version of a project, and the second project is a second version of the project.

4. The system of claim 3, wherein the one or more memory devices further include instructions that are executable by the one or more processing devices for causing the one or more processing devices to, subsequent to incorporating the first machine-learning model into the first project:
monitor the system to detect an integration of new software into the system; and
in response to detecting the integration of the new software into the system:
automatically generate the second machine-learning model in accordance with the one or more parameters using the second model-building tool; and
incorporate the second machine-learning model into the second project.

5. The system of claim 4, wherein the new software is the second model-building tool.

6. The system of claim 1, wherein the one or more memory devices further include instructions that are executable by the one or more processing devices for causing the one or more processing devices to, prior to incorporating the first machine-learning model into the first project:
execute a plurality of model-building tools to build a plurality of machine-learning models based on the one or more parameters, the plurality of model-building tools being software for building machine-learning models;
compare performance characteristics of the plurality of machine-learning models to one another to determine a candidate champion model from among the plurality of machine-learning models; and
based on determining the candidate champion model, initiate an automated champion-model approval process with respect to the candidate champion model to determine whether the candidate champion model is approved for use in the first project, wherein the automated champion-model approval process involves the one or more processing devices determining whether the candidate champion model satisfies a predefined criterion.

7. The system of claim 6, wherein the one or more memory devices further include instructions for implementing the automated champion-model approval process, the instructions being executable by the one or more processing devices for causing the one or more processing devices to:
- determine that the candidate champion model is not approved for use in the first project;
- in response to determining that the candidate champion model is not approved for use in the first project, determine a champion model that satisfies the predefined criterion, wherein the champion model is the first machine-learning model; and
- select the champion model for use in the first project.

8. The system of claim 7, wherein the one or more memory devices further include instructions that are executable by the one or more processing devices for causing the one or more processing devices to determine the champion model by:
- selecting a new candidate champion-model from among the plurality of machine-learning models, the new candidate champion-model being different from the candidate champion model, wherein the new candidate champion-model is the first machine-learning model;
- executing the automated champion-model approval process with respect to the new candidate champion-model to determine whether the new candidate champion-model satisfies the predefined criterion; and
- in response to determining that the new candidate champion-model satisfies the predefined criterion, selecting the new candidate champion-model as the champion model for use in the first project.

9. The system of claim 7, wherein the one or more memory devices further include instructions that are executable by the one or more processing devices for causing the one or more processing devices to:
- based on selecting the champion model for use in the first project, publish the champion model to a production environment that is accessible to the client device.

10. The system of claim 6, wherein the one or more memory devices further include instructions that are executable by the one or more processing devices for causing the one or more processing devices to:
- determine, via the automated champion-model approval process, that the candidate champion model is approved for use in the first project, wherein the candidate champion model is the first machine-learning model; and
- select the candidate champion model for use in the first project.

11. The system of claim 6, wherein the performance characteristics include accuracies of the plurality of machine-learning models, and wherein the predefined criterion involves the candidate champion model having an accuracy that exceeds an accuracy threshold.

12. The system of claim 6, wherein the performance characteristics include memory consumption associated with the plurality of machine-learning models, and wherein the predefined criterion involves the candidate champion model consuming an amount of memory that is below a memory usage threshold.

13. The system of claim 6, wherein the performance characteristics include computation time associated with the plurality of machine-learning models, and wherein the predefined criterion involves the candidate champion model having a computation time that is below a computation-time threshold.

14. The system of claim 6, wherein the performance characteristics include processing power associated with the plurality of machine-learning models, and wherein the predefined criterion involves the candidate champion model consuming an amount of processing power that is below a processing-power threshold.

15. The system of claim 6, wherein the predefined criterion involves the candidate champion model being compliant with a legal standard.

16. The system of claim 6, wherein the one or more memory devices further include instructions that are executable by the one or more processing devices for causing the one or more processing devices to:
- select a plurality of templates from a template repository based on the plurality of templates being compatible with the one or more parameters; and
- generate the plurality of machine-learning models using the plurality of templates.

17. The system of claim 1, wherein the one or more memory devices further include instructions that are executable by the one or more processing devices for causing the one or more processing devices to, subsequent to incorporating the first machine-learning model into the first project:
- determine a key performance metric with respect to the first machine-learning model;
- determine a performance score for the first machine-learning model based on the key performance metric;
- determine whether the performance score satisfies a preset criterion; and
- execute one or more operations based on whether the performance score satisfies the preset criterion.

18. The system of claim 1, wherein the first machine-learning model is a first version of the machine-learning model, the first project is a first version of a project, and the one or more memory devices further include instructions that are executable by the one or more processing devices for causing the one or more processing devices to, subsequent to including the first machine-learning model into the first project:
- detect an event; and
- in response to detecting the event:
  - automatically generate a new version of the machine-learning model;
  - generate a new version of the project that includes the new version of the machine-learning model; and
  - retire the first version of the project that includes the first machine-learning model.

19. The system of claim 18, wherein the event is a change in a regulation or a law existing outside the system.

20. The system of claim 1, wherein the one or more memory devices further include instructions that are executable by the one or more processing devices for causing the one or more processing devices to select the second template based on the request by:
- extracting the one or more parameters from the request; and
- using the one or more parameters extracted from the request to select the second template.

21. A method comprising:
- receiving, by one or more processing devices of a system, a request from a client device to build a machine-learning model for use in performing a task as part of a first project, the request including one or more parameters associated with the machine-learning model;
- in response to receiving the request, selecting, by the one or more processing devices, a first template that is compatible with the one or more parameters included in the request;

based on selecting the first template, converting, by the one or more processing devices, the first template into first executable code by incorporating the one or more parameters into the first template;

based on converting the first template into first executable code, providing, by the one or more processing devices, the first executable code as input to a first model-building tool for causing the first model-building tool to build a first machine-learning model based on the one or more parameters, wherein the first model-building tool is software;

based on building the first machine-learning model, incorporating, by the one or more processing devices, the first machine-learning model into the first project; and subsequent to incorporating the first machine-learning model into the first project:
  selecting, by the one or more processing devices, a second template that is compatible with the one or more parameters included in the request;
  based on selecting the second template, converting, by the one or more processing devices, the second template into second executable code by incorporating the one or more parameters into the second template;
  based on converting the second template into the second executable code, providing, by the one or more processing devices, the second executable code as input to a second model-building tool for causing the second model-building tool to build a second machine-learning model based on the one or more parameters, wherein the second machine-learning model is different from the first machine-learning model, and wherein the second model-building tool is software; and
  incorporating, by the one or more processing devices, the second machine-learning model into a second project for use in performing the task as part of the second project.

22. The method of claim 21, further comprising, subsequent to incorporating the first machine-learning model into the first project:
  monitoring the system to detect an integration of new software into the system; and
  in response to detecting the integration of the new software into the system:
    automatically generating the second machine-learning model in accordance with the one or more parameters using the second model-building tool; and
    incorporating the second machine-learning model into the second project.

23. The method of claim 21, further comprising, prior to incorporating the first machine-learning model into the first project:
  executing, by the one or more processing devices, a plurality of model-building tools to build a plurality of machine-learning models based on the one or more parameters, the plurality of model-building tools being software for building machine-learning models;
  comparing, by the one or more processing devices, performance characteristics of the plurality of machine-learning models to one another to determine a candidate champion model from among the plurality of machine-learning models; and
  based on determining the candidate champion model, initiating, by the one or more processing devices, an automated champion-model approval process with respect to the candidate champion model to determine whether the candidate champion model is approved for use in the first project, wherein the automated champion-model approval process involves automatically:
    determining, by the one or more processing devices, a characteristic of the candidate champion model; and
    determining, by the one or more processing devices, whether the characteristic of the candidate champion model satisfies a predefined criterion.

24. The method of claim 23, further comprising:
  determining, by the one or more processing devices and through the automated champion-model approval process, that the candidate champion model is not approved for use in the first project;
  in response to determining that the candidate champion model is not approved for use in the first project, determining, by the one or more processing devices, a champion model that satisfies the predefined criterion, wherein the champion model is the first machine-learning model; and
  in response to determining the champion model, selecting, by the one or more processing devices, the champion model for use in the first project.

25. The method of claim 24, further comprising determining the champion model by:
  in response to determining that the candidate champion model is not approved for use in the first project, selecting, by the one or more processing devices, a new candidate champion-model from among the plurality of machine-learning models, the new candidate champion-model being different from the candidate champion model, wherein the new candidate champion-model is the first machine-learning model;
  executing, by the one or more processing devices, the automated champion-model approval process with respect to the new candidate champion-model to determine whether the new candidate champion-model satisfies the predefined criterion; and
  in response to determining that the new candidate champion-model satisfies the predefined criterion, selecting, by the one or more processing devices, the new candidate champion-model as the champion model for use in the first project.

26. The method of claim 24, further comprising:
  based on selecting the champion model for use in the first project, publishing the champion model to a production environment that is accessible to the client device.

27. The method of claim 23, further comprising:
  determining, by the one or more processing devices and through the automated champion-model approval process, that the candidate champion model is approved for use in the first project, wherein the candidate champion model is the first machine-learning model; and
  in response to determining that the candidate champion model is approved, selecting, by the one or more processing devices, the candidate champion model for use in the first project.

28. The method of claim 23, further comprising:
  selecting a plurality of templates from a template repository based on the plurality of templates being compatible with the one or more parameters; and
  generating the plurality of machine-learning models using the plurality of templates.

29. The method of claim 21, wherein the first machine-learning model is a first version of the machine-learning model, the first project is a first version of a project, and further comprising, subsequent to including the first machine-learning model into the first project:
   detecting an event; and
   in response to detecting the event:
      automatically generating a new version of the machine-learning model;
      generating a new version of the project that includes the new version of the machine-learning model; and
      retiring the first version of the project that includes the first machine-learning model.

30. A non-transitory computer-readable medium comprising program code that is executable by one or more processing devices for causing the one or more processing devices to:
   receive a request from a client device to build a machine-learning model for use in performing a task as part of a first project, the request including one or more parameters specifying (i) a type of the machine-learning model, (ii) a number of hidden layers to include in the machine-learning model, (ii) a number of nodes to include in the machine-learning model, or (iv) a number of connections to include in the machine-learning model;
   in response to receiving the request, select a first template based on the one or more parameters included in the request;
   based on selecting the first template, convert the first template into first executable code;
   based on converting the first template into first executable code, provide the first executable code as input to a first model-building tool for causing the first model-building tool to build a first machine-learning model based on the one or more parameters, wherein the first model-building tool is software;
   based on building the first machine-learning model, incorporate the first machine-learning model into the first project;
   subsequent to incorporating the first machine-learning model into the first project, select a second model-building tool based on the one or more parameters, wherein the second model-building tool is software;
   in response to selecting the second model-building tool, provide second executable code generated using a second template as input to the second model-building tool for causing the second model-building tool to build a second machine-learning model based on the one or more parameters, wherein the second machine-learning model is different from the first machine-learning model; and
   incorporate the second machine-learning model into a second project for use in performing the task as part of the second project.

* * * * *

UNITED STATES PATENT AND TRADEMARK OFFICE
CERTIFICATE OF CORRECTION

PATENT NO. : 11,151,479 B2
APPLICATION NO. : 16/949303
DATED : October 19, 2021
INVENTOR(S) : Chengwen Chu, Wenjie Bao and Glenn Joseph Clingroth It is certified that error appears in the above-identified patent and that said Letters Patent is hereby corrected as shown below:

On the Title Page

In the inventors' section, Item (72), inventor "Glen Joseph Clingroth" should read --Glenn Joseph Clingroth--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*